(12) United States Patent
Yoshida

(10) Patent No.: US 10,983,406 B2
(45) Date of Patent: Apr. 20, 2021

(54) CURVED DISPLAY PANEL

(71) Applicant: SHARP KABUSHIKI KAISHA, Sakai (JP)

(72) Inventor: Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/475,358

(22) PCT Filed: Dec. 25, 2017

(86) PCT No.: PCT/JP2017/046308
§ 371 (c)(1),
(2) Date: Jul. 1, 2019

(87) PCT Pub. No.: WO2018/128107
PCT Pub. Date: Jul. 12, 2018

(65) Prior Publication Data
US 2019/0339556 A1 Nov. 7, 2019

(30) Foreign Application Priority Data
Jan. 6, 2017 (JP) .............................. JP2017-001130

(51) Int. Cl.
*G02F 1/1368* (2006.01)
*G02F 1/1362* (2006.01)
*G09F 9/30* (2006.01)
(52) U.S. Cl.
CPC ...... *G02F 1/1368* (2013.01); *G02F 1/136209* (2013.01); *G02F 1/136286* (2013.01); *G09F 9/30* (2013.01)

(58) Field of Classification Search
CPC ............ G02F 1/1368; G02F 1/136209; G02F 1/136286; G02F 1/134372; G02F 1/13394;
(Continued)

(56) References Cited

U.S. PATENT DOCUMENTS 7,834,962 B2 11/2010 Satake et al.
2009/0161048 A1 6/2009 Satake et al.
(Continued)

FOREIGN PATENT DOCUMENTS

JP 2009-150982 A 7/2009

*Primary Examiner* — Shahed Ahmed
(74) *Attorney, Agent, or Firm* — ScienBiziP, P.C.

(57) ABSTRACT

A curved display panel includes a display surface curved about an axis of curvature. The curved display panel includes first and second substrates, a switching component, extending portions, and a spacer portion. The first and the second substrates include plate surfaces disposed to face each other with a gap therebetween. The switching component includes a source electrode and a drain electrode. The extending portions extend from elements of the switching component except for the drain electrode. The extending portions are disposed outside an arrangement area in which the switching component is disposed. The extending portions are adjacent to the switching component in a curved direction perpendicular to the axis of curvature and along the display surface. The spacer portion is disposed on the second substrate to hold the gap. The spacer portion overlaps the switching component or one of the extending portions adjacent to the switching component.

20 Claims, 23 Drawing Sheets

(58) Field of Classification Search
CPC ......... G09F 9/30; H01L 27/3244–3279; H01L 51/5206–5218; H01L 27/1214–1296
See application file for complete search history.

(56) References Cited

U.S. PATENT DOCUMENTS

| | | | |
|---|---|---|---|
| 2015/0317015 A1* | 11/2015 | Eguchi | H01L 27/323 345/174 |
| 2015/0318339 A1* | 11/2015 | Nakamura | H01L 51/5234 257/98 |
| 2015/0372026 A1* | 12/2015 | Sato | G06F 3/0446 257/71 |
| 2017/0351141 A1* | 12/2017 | Kubota | G02F 1/13394 |

* cited by examiner

CURVED DISPLAY PANEL

TECHNICAL FIELD

The present invention relates to a curved display panel.

BACKGROUND ART

Conventionally, a liquid crystal display device described in patent document 1 is known as one example of a liquid crystal display device in which a display surface is curved. In the liquid crystal display device described in patent document 1, the long side of a pixel structure is arranged along a curved direction of a display surface, and a black matrix in which a length dimension in the curved direction of a black matrix opening is smaller than or equal to $E-L\{(T1/2)+(T2/2)+d\}/R$ is provided on an opposing substrate side, where L is a length dimension in the curved direction of the display surface, T1 is a thickness dimension of an array substrate, T2 is a thickness dimension of the opposing substrate, d is a dimension of a gap between the array substrate and the opposing substrate, R is a curvature radius of the curved display surface, and E is a length dimension of the long side of a pixel electrode provided in the pixel structure.

RELATED ART DOCUMENT

Patent Literature

PTL 1: Japanese Unexamined Patent Publication No. 2009-150982

Problem to be Solved by the Invention

In the liquid crystal display device described in patent document 1, a spherical resin spacer agent is used to hold the gap between the array substrate and the opposing substrate, that is, a cell gap, but a columnar photospacer is sometimes used other than the spherical resin spacer agent. When provide on the opposing substrate side, for example, the columnar photospacer holds the cell gap as a distal end thereof is brought into contact with the array substrate. However, if the display surface is curved, the contacting position of the photospacer with respect to the array substrate may vary, thus causing the cell gap to be uneven and consequently arising display failure.

DISCLOSURE OF THE PRESENT INVENTION

The present invention has been completed based on the situations described above, and aims to suppress the occurrence of display failure.

Means for Solving the Problem

A curved display panel according to the present invention relates to a curved display panel in which a display surface that displays an image is curved around at least one axis of curvature. The curved display panel includes first and second substrates, at least one switching component, extending portions, and at least one spacer portion. The first and the second substrates include plate surfaces disposed to face each other with a gap therebetween. The switching component is included in the first substrate. The at least one switching component includes at least a source electrode and a drain electrode. The at least one switching component is configured to control a current between the source electrode and the drain electrode. The extending portions extend from elements of the at least one switching component except for at least the drain electrode in the first substrate. The extending portions are disposed outside an arrangement area in which the at least one switching component is disposed. The extending portions are adjacent to the at least one switching component in a curved direction perpendicular to the axis of curvature and along the display surface. The at least one spacer portion is disposed on the second substrate to hold the gap between the first and the second substrates. The at least one spacer portion is arranged to overlap at least the switching component or one of the extending portions adjacent to the at least one switching component.

Therefore, an image is displayed on the curved display surface by controlling the current between the source electrode and the drain electrode in the switching component. The gap between the first and the second substrates can be held by the spacer portion provided on the second substrate in which the respective plate surfaces face each other with a gap. The position of the spacer portion with respect to first substrate varies in the curved direction as the curved display panel is curved around the at least one axis of curvature, which may cause the gap between the substrates held by the spacer portion to vary.

In regards to this, the extending portion obtained by expanding the configuring element omitting at least the drain electrode of the switching component from the forming range of the switching component is arranged to be adjacent to each other in the curved direction with respect to the switching component, and is arranged so that the spacer portion overlaps at least one of the switching component and the extending portion. Thus, even if the position of the spacer portion with respect to first substrate varies in the curved direction as a result of the curved display panel being curved around the at least one axis of curvature, a situation where the spacer portion does not overlap neither the switching component nor the extending portion is less likely to occur, and the reliability in which the spacer portion overlaps either the switching component and the extending portion becomes high. Therefore, even if a step difference forms between a region that overlaps the switching component and the extending portion in first substrate and a region that does not overlap the switching component and the extending portion, the gap between the substrates held by the spacer portion is less likely to vary and stabilizes, so that unevenness is less likely to occur in the image displayed on the display surface.

Embodiments of the present invention preferably have the following configurations.

(1) A first line extending along the at least one axis of curvature and a second line extending along the curved direction are at least provided on the first substrate; the switching component at least includes a gate electrode connected to the first line or the second line, and a channel portion formed of a semiconductor material and superimposing the gate electrode by way of an insulating film to be connected to the source electrode and the drain electrode, the source electrode being connected to the second line or the first line; and the extending portion at least includes an electrode extending portion formed of a material same as the gate electrode or the source electrode connected to the first line and arranged to be adjacent to each other to the gate electrode or the source electrode in the curved direction and to overlap one part of the second line, and a channel extending portion formed of a material same as the channel portion and arranged to be adjacent to each other to the channel portion in the curved direction and to overlap one part of the second line and the electrode extending portion. Therefore, an image is displayed on the curved display surface when the switching component is driven based on a signal provided from the first line and the second line to the gate electrode and the source electrode and an image signal is provided from the source electrode to the drain electrode through the channel portion. The extending portion at least includes an electrode extending portion and a channel extending portion obtained by expanding a gate electrode or a source electrode, which are configuring elements omitting the drain electrode in the switching component and the channel portion, and is arranged to overlap a part of the second line, so that a step difference barely forms between a region that overlaps the switching component in first substrate and a region that overlaps the extending portion. Thus, the gap between the substrates held by the spacer portion is less likely to vary.

(2) The channel extending portion is arranged to continue to the channel portion and so that an entire region overlaps the electrode extending portion. Therefore, the channel extending portion does not have a portion in which the entire region is arranged to overlap the electrode extending portion and does not overlap the electrode extending portion, that is, a portion protruding to the outer side from the outer shape of the electrode extending portion. Therefore, when the outside light is irradiated on the curved display panel, such outside light is less likely to be irradiated on the channel extending portion. Thus, if the channel extending portion includes a portion protruding to the outer side from the outer shape of the electrode extending portion, the irradiation light quantity with respect to the channel extending portion fluctuates when the irradiation light quantity of the outside light with respect to the curved display panel fluctuates, and accompanying therewith, the capacitance value of the source electrode and the drain electrode connected to the channel portion continuing to the channel extending portion fluctuates, and as a result, display failure may occur. With regards to this, as the outside light is less likely to be irradiated on the channel extending portion as described above, the display failure is less likely to occur even if the irradiation light quantity of the outside light with respect to the curved display panel fluctuates.

(3) The switching component at least includes a channel portion formed of a semiconductor material and connected to the source electrode and the drain electrode; and an inter-electrode light shielding portion arranged to straddle at least both the source electrode and the drain electrode is provided on the first substrate. Thus, an image signal is provided from the source electrode to the drain electrode through the channel portion formed of a semiconductor material. Since the inter-electrode light shielding portion is arranged to straddle both the source electrode and the drain electrode, the outside light can be suppressed from being irradiated on the channel portion formed of a semiconductor material located at a portion between the source electrode and the drain electrode. Thus, the fluctuation in the property of the switching component, in particular, the leak current that may occur in the switching component in the OFF state can be reduced. Furthermore, as the inter-electrode light shielding portion is provided on first substrate together with the switching component to be light shielded, the positional misalignment with respect to the switching component due to the curved display panel being curved around the at least one axis of curvature is avoided, whereby the reliability of appropriately exhibiting the light shielding performance becomes high.

(4) An extended light shielding portion obtained by expanding the inter-electrode light shielding portion and arranged to at least partially overlap the extending portion is provided on the first substrate. The inter-electrode light shielding portion is arranged to at least partially overlap the switching component. On the other hand, the extended light shielding portion obtained by expanding the inter-electrode light shielding portion is arranged to partially overlap the extending portion, and hence a step difference that may form between the region that overlaps the switching component in first substrate and the region that overlaps the extending portion is reduced compared to when the extended light shielding portion is not provided. Therefore, even when the position of the spacer portion with respect to the first substrate is either the region that overlaps the switching component and the region that overlaps the extending portion, or even when crossing both regions, the gap between the substrates is less likely to vary.

(5) The switching component and the inter-electrode light shielding portion are arranged in plurals at intervals in at least one of an axial direction of the at least one axis of curvature and the cured direction; at least a pixel electrode connected to the drain electrode, a common electrode arranged to overlap the pixel electrode through an insulating film and supplied with a reference potential, and a coupling light shielding portion that couples the inter-electrode light shielding portions arranged at intervals in at least one of the axial direction of the at least one axis of curvature and the curved direction are provided on the first substrate; and the inter-electrode light shielding portion and the coupling light shielding portion are formed of a material having light shielding property and conductivity, and are arranged to make contact with the common electrode. Thus, the pixel electrode is charged with the provision of the image signal from the source electrode to the drain electrode of the switching component. A potential difference based on the voltage value charged to the pixel electrode forms between the common electrode to which the reference potential is supplied and the pixel electrode, and display of a predetermined tone is made on the display surface based on the potential difference. The coupling light shielding portion couples a plurality of inter-electrode light shielding portions arranged at intervals in at least one of the axial direction of the at least one axis of curvature and the curved direction, is formed of a material having light shielding property and conductivity together with the inter-electrode light shielding portion, and arranged to make contact with the common electrode, so that lower resistance of the common electrode can be achieved. Therefore, the common electrode is stably maintained at the reference potential, whereby occurrence of display failure such as shadowing is suppressed.

(6) The extending portion is arranged in a pair to be adjacent to each other to one side and the other side in the curved direction with respect to the switching component. Thus, the extending portions are arranged adjacent to each other on one side and the other side in the curved direction with respect to the switching component. Such an arrangement range becomes the fluctuation tolerable range of the position of the spacer portion with respect to first substrate. Therefore, the variation in the position of the spacer portion with respect to first substrate involved in the curving of the curved display panel can be absorbed over a wider range, and hence the gap between the substrates further stabilizes. Furthermore, even when the position of the spacer portion with respect to first substrate is shifted to either the one side or the other side in the curved direction with respect to the switching component due to the curved display panel being curved around the at least one axis of curvature, the reliability in which the spacer portion is arranged to overlap one of the extending portions becomes high. Therefore, the degree of freedom of design in setting the curved shape of the curved display panel becomes high.

(7) A plurality of the spacer portions are dispersed within a plane of the display surface; and among the spacer portions, the spacer portion arranged at a position closest to the at least one axis of curvature in the curved direction is located at a center of the switching component in the first substrate. Thus, the gap between the substrates is satisfactorily held by the spacer portions dispersed within the display surface. Among the spacer portions, in the spacer portion arranged at a position closest to the at least one axis of curvature in the curved direction, the position with respect to first substrate barely changes in the curved direction between before and after the curved display panel is curved, and even if the position has changed, the change amount is very small. The spacer portion arranged at a position closest to the at least one axis of curvature in the curved direction is located at a middle of the switching component in the first substrate, and thus even if the position with respect to the first substrate changes according to the arrangement of each spacer portion in the curved direction with respect to the at least one axis of curvature, the reliability of superimposing at least one of the switching component and the extending portions becomes high. Thus, the gap between the substrates held by the spacer portions is more unlikely to vary.

(8) A line extending along the curved direction, connected to the switching component and arranged to at least partially overlap the extending portion is at least provided on the first substrate; and the extending portion is selectively arranged to be adjacent to each other on only one side in the curved direction with respect to the switching component. Accordingly, compared to when the extending portion is arranged to be adjacent to each other on one side and the other side in the curved direction with respect to the switching component, the superimposing range of the extending portion with respect to the line becomes narrow. Thus, signal blunt that may occur in the signal transmitted to the line is reduced.

(9) The extending portion is arranged to be adjacent to each other on a side opposite to the at least one axis of curvature side in the curved direction with respect to the switching component when the second substrate is arranged closer to the at least one axis of curvature than the first substrate, and is arranged to be adjacent to each other on the at least one axis of curvature side in the curved direction with respect to the switching component when the second substrate is arranged farther from the at least one axis of curvature than the first substrate. Thus, first when the second substrate is arranged closer to the at least one axis of curvature than the first substrate, the position of the spacer portion with respect to the first substrate tends to easily shift toward a side opposite to the at least one axis of curvature side in the curved direction with the curving of the curved display panel. In this case, as the extending portion is arranged to be adjacent to each other to a side opposite to the at least one axis of curvature side in the curved direction with respect to the switching component, the reliability in which the positionally misaligned spacer portion is arranged to overlap the extending portion with respect to the first substrate side becomes high. On the other hand, when the second substrate is arranged farther from the at least one axis of curvature than the first substrate, the position of the spacer portion with respect to the first substrate tends to easily shift toward the at least one axis of curvature side in the curved direction with the curving of the curved display panel. In this case, as the extending portion is arranged to be adjacent to each other to the at least one axis of curvature side in the curved direction with respect to the switching component, the reliability in which the positionally misaligned spacer portion is arranged to overlap the extending portion with respect to the first substrate side becomes high.

(10) The switching component, the extending portion, and the spacer portion are lined in plurals at intervals in at least the curved direction; and in the extending portions, the extending portion arranged closer to the at least one axis of curvature in the curved direction has a narrower forming range in the curved direction than the extending portion arranged farther from the at least one axis of curvature in the curved direction. In the spacer portions lined at intervals in the curved direction, the spacer portion arranged closer to the at least one axis of curvature in the curved direction tends to have a smaller positional misalignment amount with respect to the first substrate involved in the curved display panel being curved around the at least one axis of curvature compared to the spacer portion arranged farther from the at least one axis of curvature in the curved direction. On the other hand, in the extending portions lined at intervals in the curved direction, the extending portion arranged closer to the at least one axis of curvature in the curved direction tends to have a narrower forming range in the curved direction than the extending portion arranged farther from the at least one axis of curvature in the curved direction, and thus the reliability in which the spacer portion is located in a region superimposing the extending portion in first substrate is sufficiently ensured, and it is suitable in narrowing the occupying region of the extending portion in the first substrate.

(11) At least a signal transmitting members that transmit a signal for driving at least the switching component are selectively connected to both ends in the curved direction of an outer peripheral end of the first substrate. Thus, the switching component is driven based on a signal transmitted by the signal transmitting member. The signal transmitting members are selectively connected to both ends in the curved direction of the outer peripheral end of the first substrate, respectively, so that the signal transmitting member is avoided from being connected to an end in the axial direction of the at least one axis of curvature of the outer peripheral end of the first substrate, and the stress that acts on the curved display panel with the curving of the curved display panel is easily equalized in the curved direction. Therefore, to which side in the curved direction the spacer portion is positionally misaligned with respect to the first substrate with the curving of the curved display panel can be easily specified, whereby the reliability in which the spacer portion is arranged to overlap the extending portion with respect to the first substrate becomes high.

(12) A first line extending along the at least one axis of curvature and connected to the switching component, and a second line extending along the curved direction and connected to the switching component, and being arranged to at least partially overlap the extending portion are at least provided on the first substrate; and the extending portion is arranged separated from the switching component at a position with a gap in the curved direction with respect to the switching component. When the extending portion is continued to the switching component and electrically connected to the first line, parasitic capacitance occurs between the second line and a portion connected to the first line of the extending portion superimposing the second line and the occurrence of a signal blunt in a signal transmitted to the second line becomes a concern. However, as the extending portion arranged to overlap the second line is electrically cut away from the first line connected to the switching component, the parasitic capacitance that may occur between the second line and the extending portion is reduced, and hence the signal blunt is less likely to occur in the signal transmitted to the second line.

(13) In the extending portion, a gap provided between the extending portion and the switching component is smaller than a dimension in the curved direction of the spacer portion. The portion between the switching component and the extending portion adjacent to each other has a step form with respect to the switching component and the extending portion. Even when the spacer portion is arranged to overlap the portion between the switching component and the extending portion, one part of the spacer portion is arranged to overlap at least one of the switching component and the extending portion. Therefore, the gap holding function by the spacer portion is appropriately exhibited, and hence the gap between the substrates is more unlikely to vary.

(14) A pixel electrode connected to the drain electrode is provided in plurals along an axial direction of the at least one axis of curvature and the curved direction on the first substrate; and a plurality of color filters exhibiting different colors from each other are provided along the axial direction of the at least one axis of curvature on the second substrate to overlap the pixel electrodes, the color filters extending along the curved direction and being arranged to straddle the pixel electrodes lined along the curved direction. Thus, when the pixel electrode is charged with the provision of the image signal from the source electrode to the drain electrode of the switching component, the transmitting light quantity of each color filter is controlled based on a voltage value thereof, and hence a color display of a predetermined tone is made on the display surface. Even when the arrangement of the color filter with respect to the pixel electrode of first substrate varies in the curved direction due to the curved display panel being curved, the color filters exhibiting different colors are lined along the axial direction of the at least one axis of curvature, and each color filter is extended along the curved direction and arranged to straddle the pixel electrodes lined along the curved direction, and thus mixing of color is less likely to occur.

Advantageous Effect of the Invention

According to the present invention, occurrence of display failure can be suppressed.

BEST MODE FOR CARRYING OUT THE INVENTION

First Embodiment

A first embodiment of the present invention will be described with reference to FIGS. 1 to 8. In the present embodiment, a curved liquid crystal panel 10 arranged in a liquid crystal display device will be illustrated. X axis, Y axis, and Z axis are indicated in one part of each figure, and each axial direction is drawn to indicate the direction shown in each figure. The up and down direction is referred to with FIGS. 2 and 3 as a reference, where the upper side in the figures is a front side and the lower side in the figures is the back side.

Figure 1:
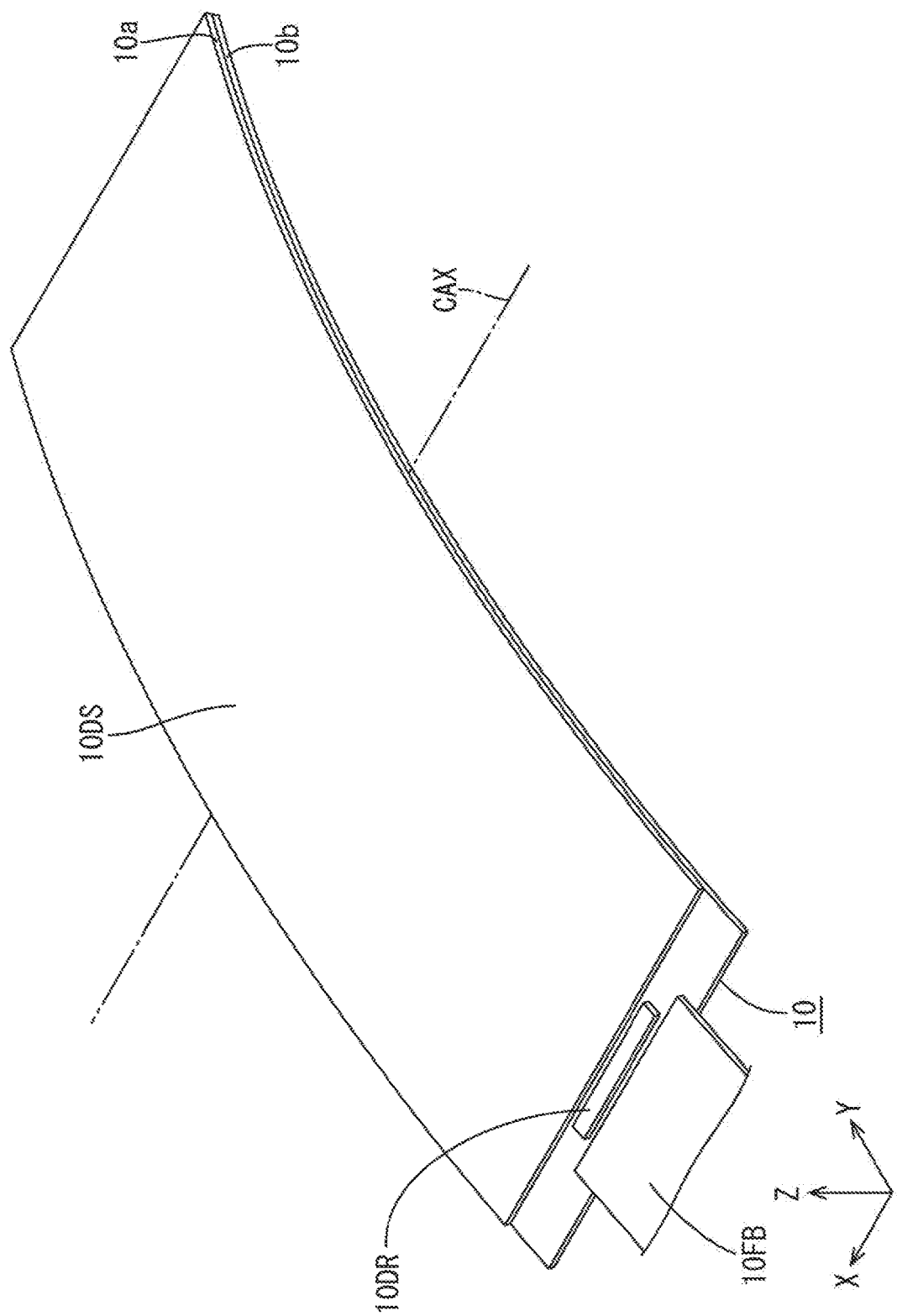
FIG. 1 is a schematic perspective view of a curved liquid crystal panel according to a first embodiment of the present invention.

As shown in FIG. 1, in the curved liquid crystal panel (curved display panel) 10, a display surface 10DS that displays an image is curved, so that the image is displayed on the curved display surface 10DS using an illumination light irradiated from a backlight device (lighting device), which is an external light source (not shown). The curved liquid crystal panel 10 forms the liquid crystal display device together with the backlight device and the like. The liquid crystal display device according to the present embodiment is, for example, preferably used in in-vehicle applications such as a car navigation system, where a screen size of the curved liquid crystal panel 10 is preferably, for example, about 28.2 inches, but this is not necessarily the sole case.

As shown in FIG. 1, the curved liquid crystal panel 10 overall has an elongate square shape (rectangular shape, longitudinal shape), and is curved to a substantially circular arc shape in which a central portion in the long side direction bulges out toward the front side and both ends in the long side direction are retracted toward the back side (outwardly warped shape) so that the cross-sectional shape is a substantially C-shape. The curved liquid crystal panel 10 has the short side direction coinciding with the X axis direction in each figure, the long side direction coinciding with the Y axis direction in each figure, and the plate thickness direction coinciding with the Z axis direction in each figure. A curved axis CAX in the curved liquid crystal panel 10 has the axial direction thereof coinciding with the short side direction (X axis direction) of the curved liquid crystal panel 10, and a curved direction (direction in which the curvature of the display surface 10DS changes), which is a direction orthogonal to the curved axis CAX and lying along the display surface 10DS, coincides with the long side direction (Y axis direction) of the curved liquid crystal panel 10. The curvature radius of the curved liquid crystal panel 10 is preferably, for example, about 2000 mm, but is not necessarily limited thereto. The illustration of the backlight device is omitted in the present embodiment, but is preferably a shape curved so as to follow the curved liquid crystal panel 10. However, this is not necessarily the sole case.

Figure 2:
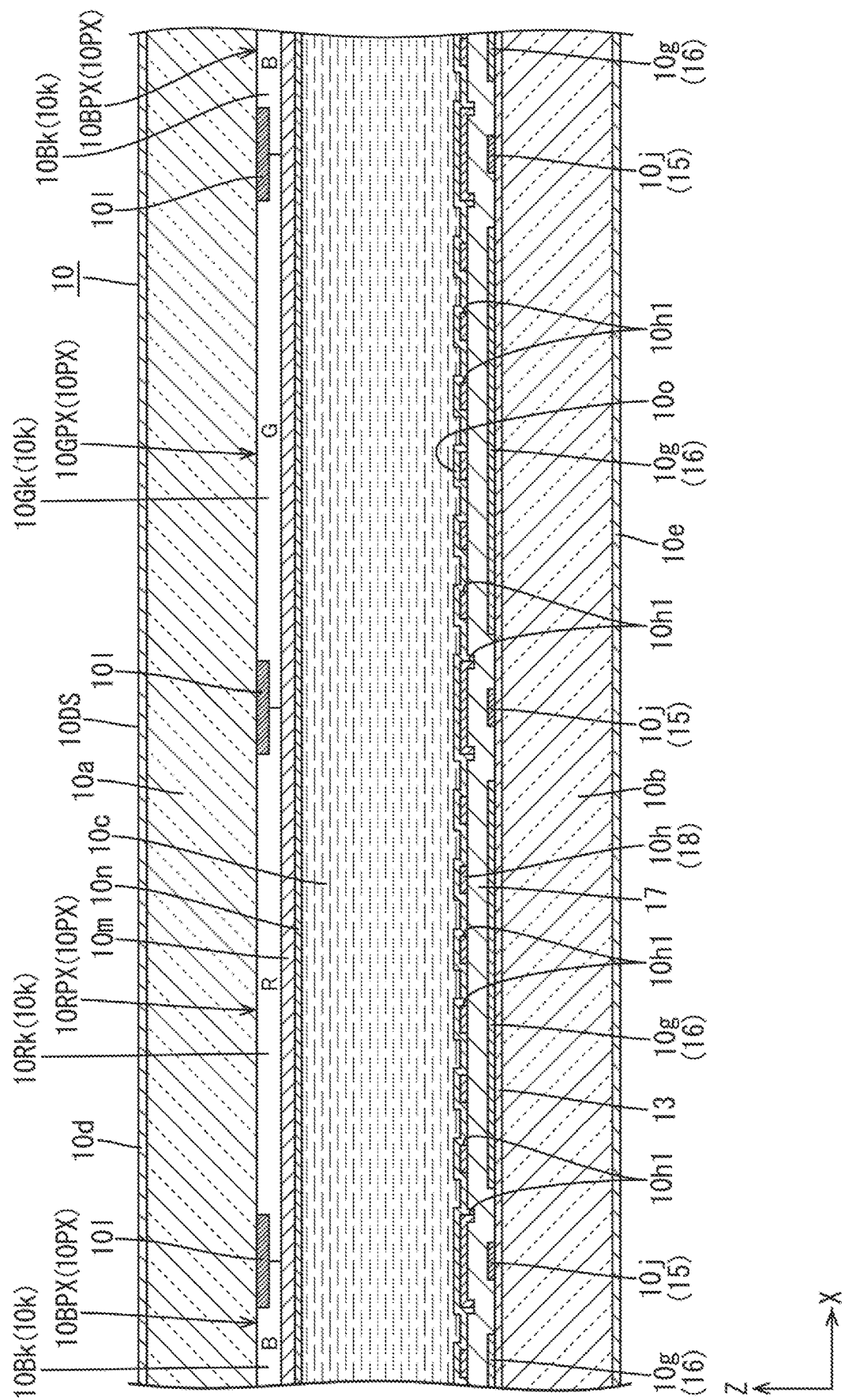
FIG. 2 is a cross-sectional view in which the curved liquid crystal panel is cut along a short side direction.

As shown in FIG. 2, the curved liquid crystal panel 10 at least includes substrates 10a, 10b made of glass that is substantially transparent and that has excellent translucency, and a liquid crystal layer 10c that is interposed between the substrates 10a, 10b and that contains liquid crystal molecules, which are substances which optical properties change with application of an electric field, and the substrates 10a, 10b are laminated with a sealing agent (not shown) while maintaining a cell gap of a thickness of the liquid crystal layer 10c. The front side (front surface side) of the substrates 10a, 10b configuring the curved liquid crystal panel 10 is assumed as a CF substrate (opposing substrate, second substrate) 10a, and the back side (rear surface side) is assumed as an array substrate (active matrix substrate, TFT substrate, first substrate) 10b. As shown in FIG. 1, the CF substrate 10a is laminated with one end in the long side direction aligned with respect to the array substrate 10b, the long side dimension of the CF substrate 10a being shorter than the long side dimension of the array substrate 10b. Therefore, the other end in the long side direction of the array substrate 10b projects out to the side with respect to the CF substrate 10a, and a driver (panel driving component) 10DR for driving the curved liquid crystal panel 10 and a flexible substrate (signal transmitting member) 10FB to be relay connected to a signal supplying source are connected (mounted) to the projected portion. The array substrate 10b is arranged closer to the curved axis CAX than the CF substrate 10a in the Z axis direction (configuration in which the curved axis CAX is arranged on the array substrate 10b side in the Z axis direction). As shown in FIG. 2, the CF substrate 10a and the array substrate 10b are both formed by stacking various types of films on an inner surface side of the glass substrate. Polarization plates 10d, 10e are attached to an outer surface side of the substrates 10a, 10b, respectively. Each glass substrate of the CF substrate 10a and the array substrate 10b preferably has, for example, a plate thickness of about 0.1 mm, but is not necessarily limited thereto. Furthermore, the curved liquid crystal panel 10 is divided into a display region at a central side of the screen in which the image is displayed, and a non-display region at an outer peripheral side of the screen forming a frame shape so as to surround the display region and in which the image is not displayed. The display region has an elongate square shape similar to the curved liquid crystal panel 10 and has a long side dimension thereof, for example, about 691 mm, but this is not necessarily the sole case.

Figure 4:
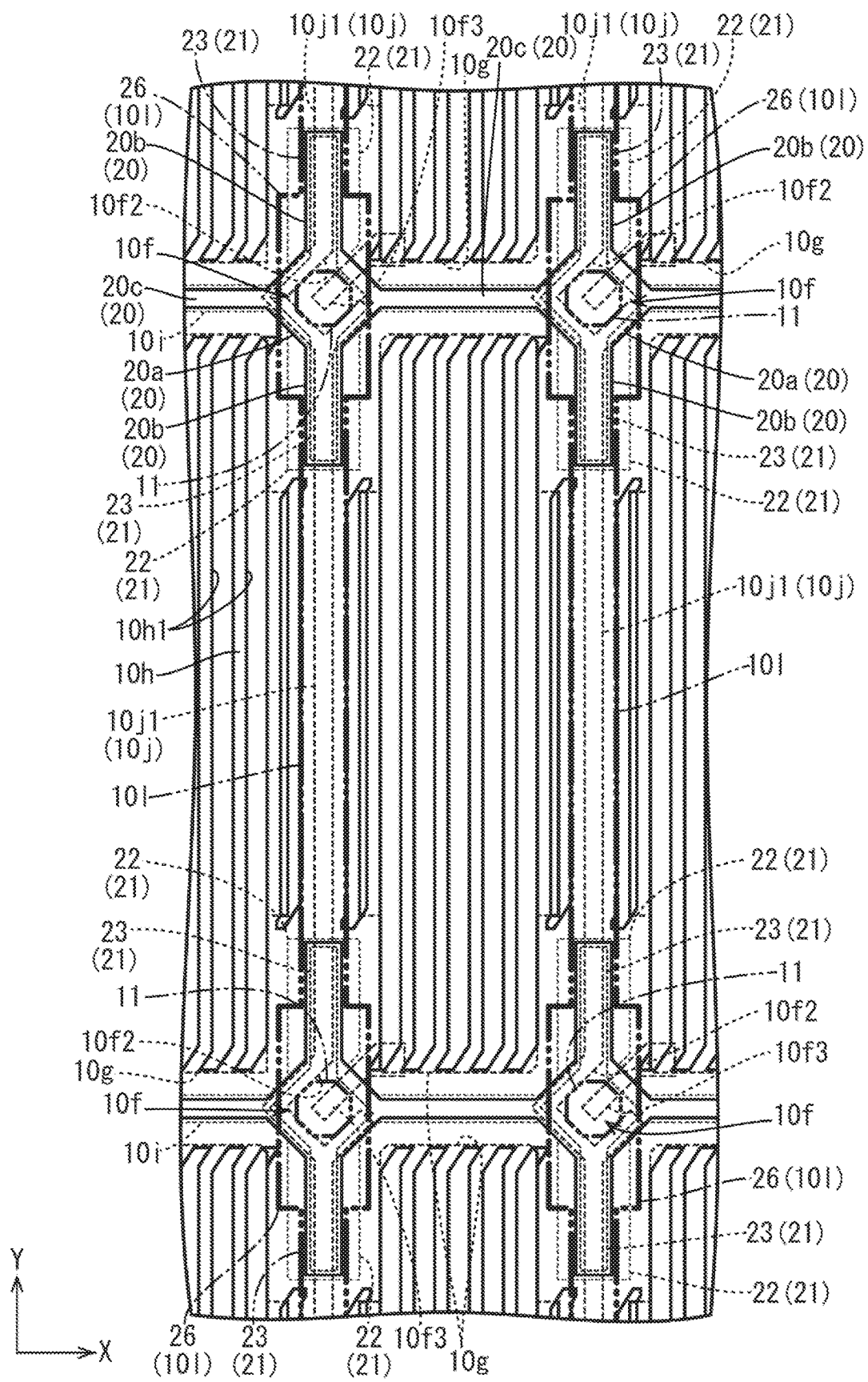
FIG. 4 is a plan view showing a line configuration in a display region of an array substrate forming the curved liquid crystal panel.

As shown in FIGS. 2 and 4, the display region on the inner surface side of the array substrate 10b (liquid crystal layer 10c side, opposing surface side of the CF substrate 10a) is provided with a great number of TFT (switching components) 10f and pixel electrodes 10g lined along the X axis direction and the Y axis direction in a matrix form (rows and columns). A gate line (scanning line, first line) 10i and a source line (data line, signal line, second line) 10j forming a lattice form are arranged at the periphery of the TFTs 10f and the pixel electrodes 10g so as to surround the same. The gate line 10i is extended along the X axis direction, that is, the axial direction of the curved axis CAX, and the source line 10j is extended along the Y axis direction, that is, the curved direction. The gate line 10i and the source line 10j are respectively connected to a gate electrode 10f1 and a source electrode 10f2 of the TFT 10f, respectively, and the pixel electrode 10g is connected to a drain electrode 10f3 of the TFT 10f. The TFT 10f is driven based on various signals provided from the gate line 10i and the source line 10j, and the supply of potential to the pixel electrode 10g is controlled by the driven of the TFT. The pixel electrode 10g has a planar shape of substantially elongate square shape, where the long side direction coincides with the Y axis direction (long side direction of the curved liquid crystal panel 10, curved direction), and the short side direction coincides with the X axis direction (axial direction of the curved axis CAX). Furthermore, a common electrode 10h is formed on an upper layer side (side closer to the liquid crystal layer 10c) than the pixel electrode 10g so overlap the pixel electrode 10g on the inner surface side of the display region of the array substrate 10b. The common electrode 10h is constantly supplied with a substantially constant reference potential, and is extended over substantially the entire region of the display region. A plurality of elongate slits 10h1 are opened and formed at the portion superimposing with each pixel electrode 10g. When a potential difference forms between the pixel electrode 10g and the common electrode 10h superimposing each other with the charging of the pixel electrode 10g, a fringe electric field (oblique electric field) including a component of a normal direction with respect to the plate surface of the array substrate 10b in addition to a component along the plate surface of the array substrate 10b is applied to the liquid crystal layer 10c. That is, in the curved liquid crystal panel 10 according to the present embodiment, the operation mode is a Fringe Field Switching (FFS) mode.

Figure 5:
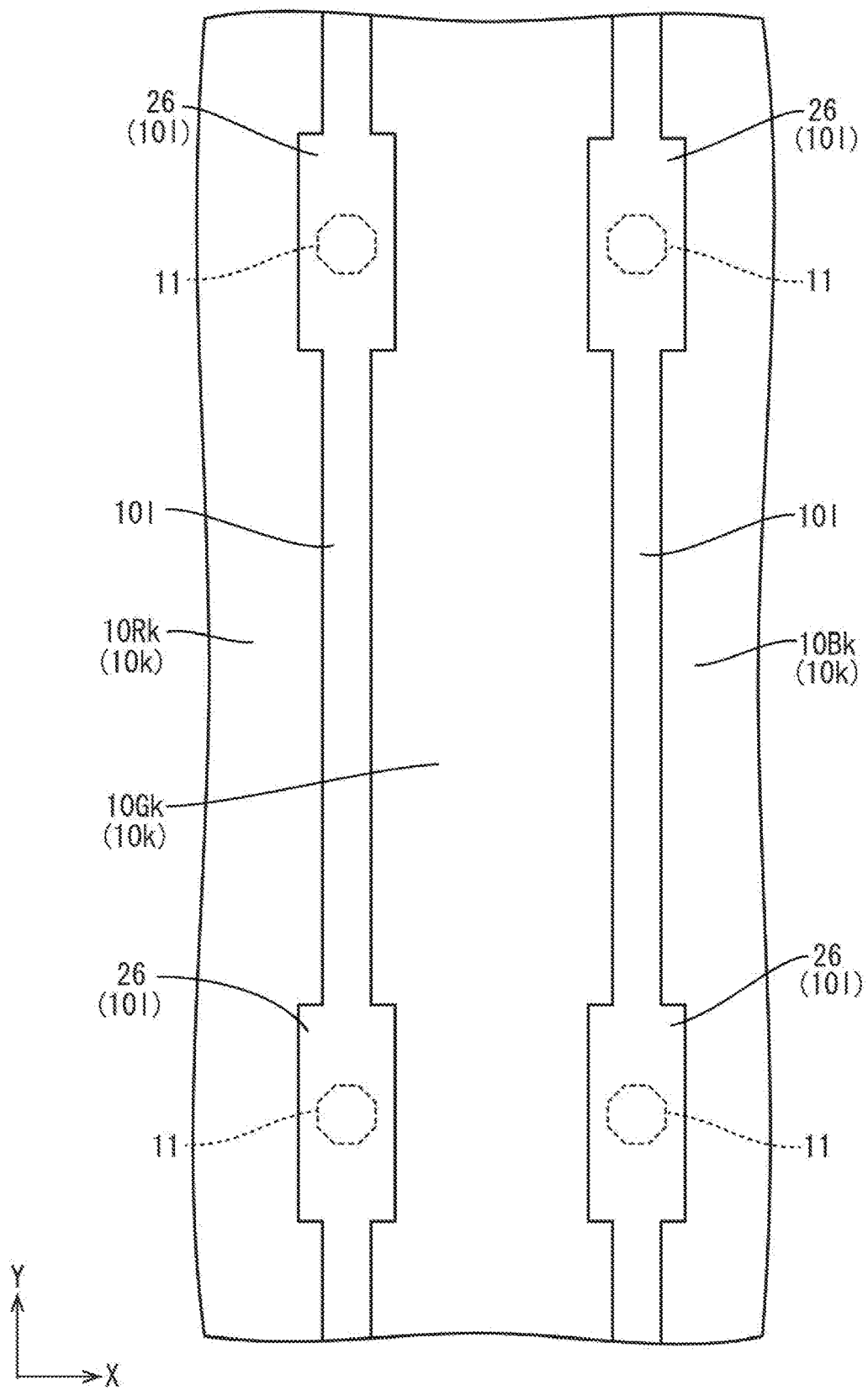
FIG. 5 is a plan view showing a configuration in a display region of a CF substrate forming the curved liquid crystal panel.

As shown in FIGS. 2 and 5, a great number of color filters (coloring portions) 10k are provided at positions opposing each pixel electrode 10g on the array substrate 10b side are provided in the display region on the inner surface side of the CF substrate 10a (liquid crystal layer 10c side, opposing surface side of array substrate 10b). The color filter 10k and the pixel electrode 10g opposing each other form a pixel portion 10PX. The color filter 10k is formed by having three colors of a red color filter (red coloring portion) 10Rk that exhibits red, a green color filter (green coloring portion) 10Gk that exhibits green, and a blue color filter (blue coloring portion) 10Bk that exhibits blue repeatedly lined along the X axis direction in a predetermined order. The color filter 10k contains a pigment corresponding to the exhibiting color, and selectively transmits an exhibiting color light (light of specific color) as the pigment absorbs non-exhibiting color light. In the color filters 10Rk, 10Gk, and 10Bk of each color, the arrangement in the X axis direction is aligned with the arrangement of the pixel electrode 10g on the array substrate 10b side, and the color filters configure pixel portions 10RPX, 10GPX, and 10BPX of three colors of R, G, and B together with the opposing pixel electrode 10g. In the curved liquid crystal panel 10, a display pixel in which a color display of a predetermined tone can be made is configured by the pixel portions 10RPX, 10GPX, and 10BPX of three colors of R, G, and B adjacent to each other along the X axis direction. The display pixel is arranged by great numbers along the X axis direction and the Y axis direction in a plane of the display surface 10DS. The color filters 10Rk, 10Gk, and 10Bk of each color are respectively extended over substantially the entire length of the display region along the Y axis direction, and are arranged to cross (traverse) all of the pixel electrodes 10g lined along the Y axis direction. That is, in the pixel portion 10RPX, 10GPX, and 10BPX of each color, the pixel portion of the same color is arranged by great numbers along the Y axis direction. In the present embodiment, the short side dimension of the pixel portion 10PX is assumed to be, for example, about 60 µm, and the long side dimension is assumed to be, for example, about 180 µm, but this is not necessarily the sole case. Furthermore, in the present embodiment, the arranged number of display pixels in the long side direction of the curved liquid crystal panel 10 is, for example, 3840, and the arranged number of display pixels in the short side direction is, for example, 1080, but this is not necessarily the sole case.

As shown in FIGS. 2 and 5, an inter-pixel light shielding portion (black matrix) 10l is formed on the CF substrate 10a so as to partition the color filters 10k (pixel portion 10PX) adjacent to each other in the X axis direction. The inter-pixel light shielding portion 10l formed of a light shielding material in which the surface exhibits black color, and partitions the pixel portions 10PX that are adjacent to each other in the X axis direction and that exhibit different colors from each other. Thus, mixing of color is prevented from occurring between the pixel portions 10PX exhibiting different colors from each other, so that independency of the tones of the pixel portions 10PX can be guaranteed. The inter-pixel light shielding portion 10l is extended over substantially the entire length of the display region along the Y axis direction, and is arranged to overlap the source line 10j on the array substrate 10b side when seen in plan view. An overcoat film 10m is provided on the surfaces of the color filter 10k and the inter-pixel light shielding portion 10l. A spacer portion 11, to be described next, is provided on the surface of the overcoat film 10m. Furthermore, oriented films 10n, 10o for orienting the liquid crystal molecules contained in the liquid crystal layer 10c are respectively formed as a layer on the innermost side (close to the liquid crystal layer 10c) of the substrates 10a, 10b to be brought into contact with the liquid crystal layer 10c. A liquid crystal material in which a dielectric anisotropy is positive or negative can be used for the liquid crystal layer 10c, and a horizontal oriented film and a vertical oriented film can be used for the oriented films 10n, 10o. In the present embodiment, the liquid crystal material in which the dielectric anisotropy is positive and the horizontal oriented film are used, where an orientation process (rubbing etc.) for setting an initial orientation (orientation in a state voltage is not applied) of the liquid crystal molecules is performed on the horizontal oriented film.

Figure 3:
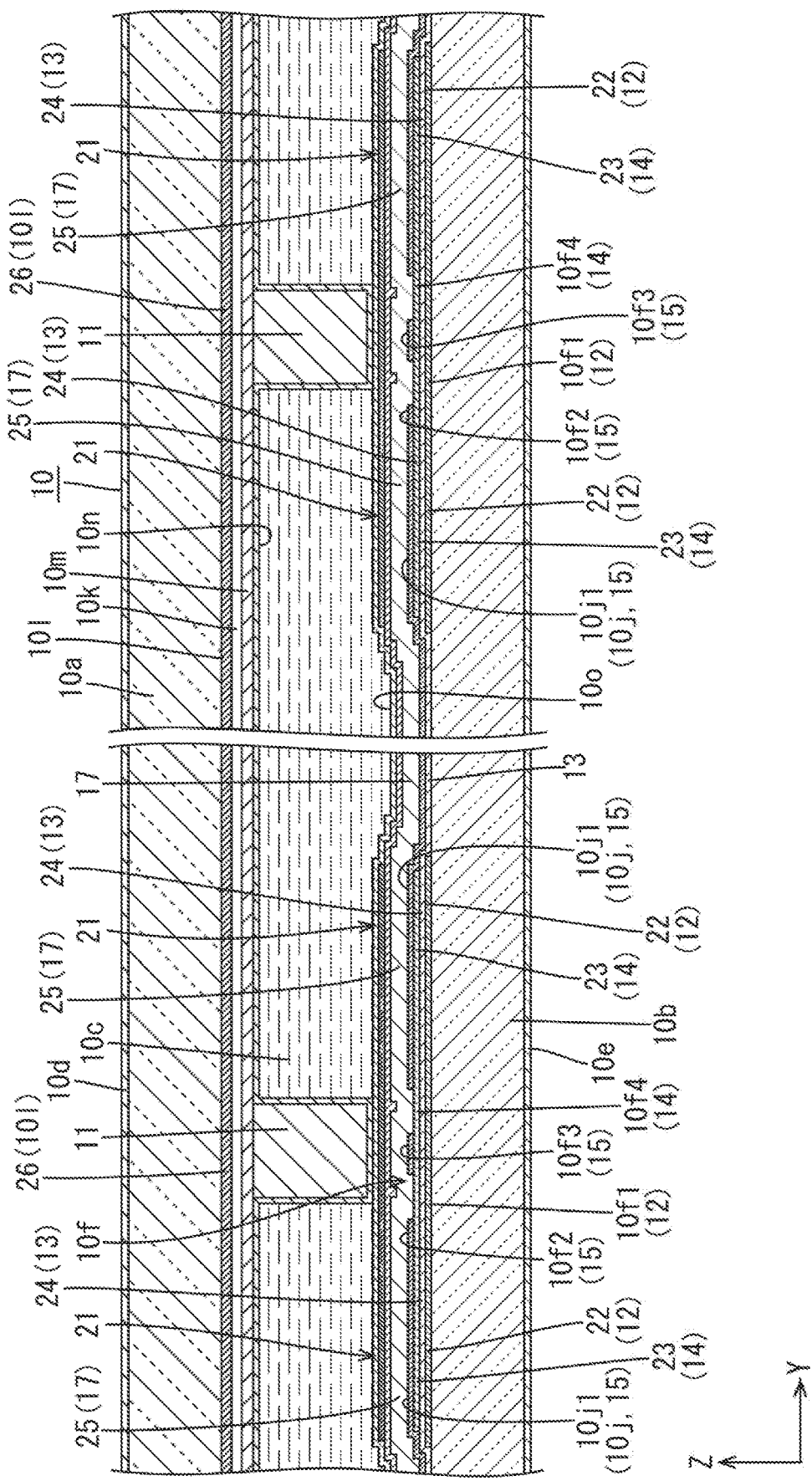
FIG. 3 is a cross-sectional view in which the curved liquid crystal panel is cut along a long side direction.
Figure 6:
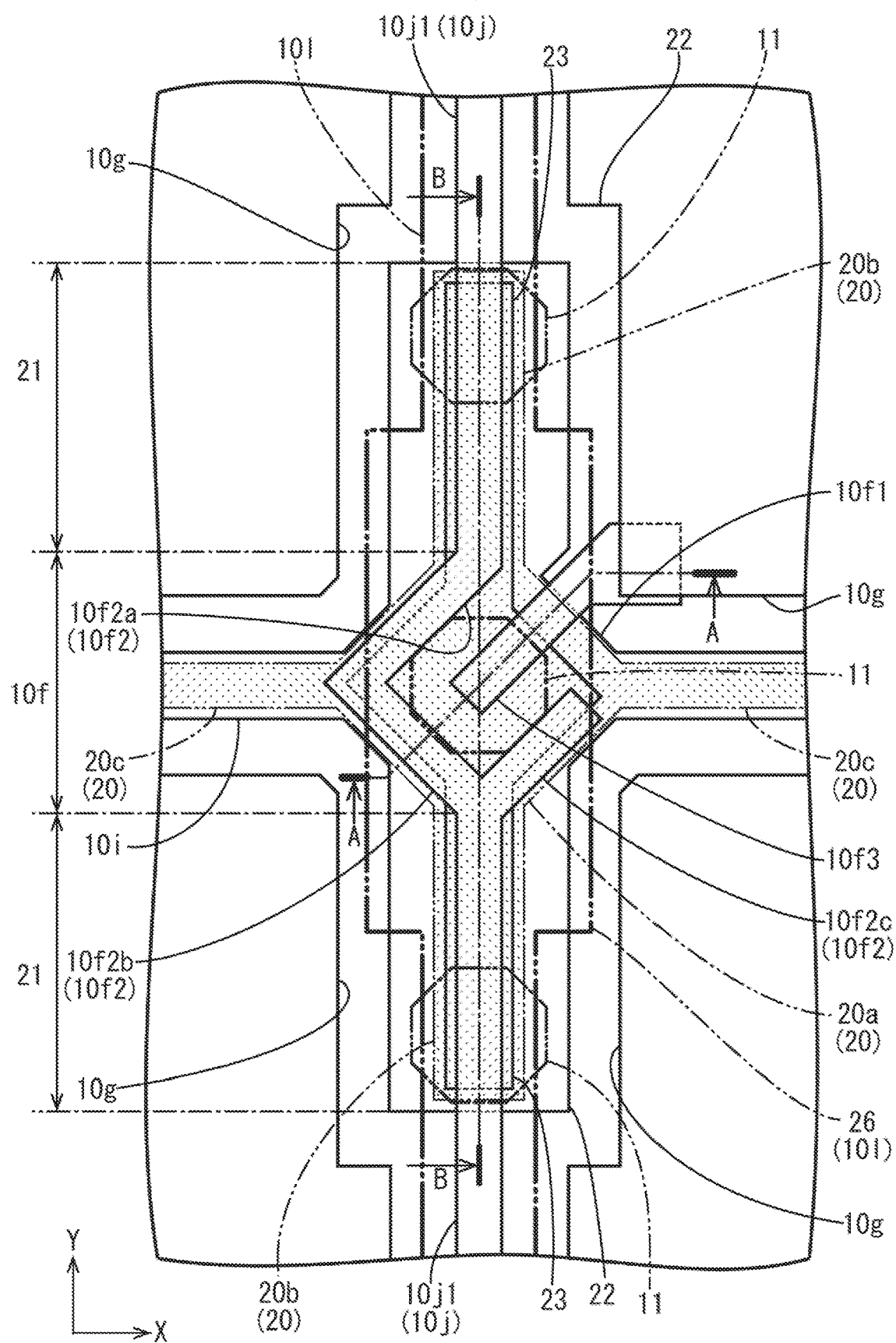
FIG. 6 is a plan view in which a vicinity of a TFT in a display region of the array substrate is enlarged.

As shown in FIG. 3, the spacer portion 11 is interposed between the substrates 10a, 10b to hold the gap between the substrates. Specifically, the spacer portion 11 can hold the gap, that is, the cell gap (thickness of the liquid crystal layer 10c) between the substrates 10a, 10b constant in the display region by being brought into contact with an oriented film 10e having a columnar shape so as to project out to pass through the liquid crystal layer 10c from the overcoat film 10m toward the array substrate 10b in the CF substrate 10a and being arranged on the innermost side on the array substrate 10b side to which the projecting distal end faces. Although it will be described in detail later, a great number of spacer portions 11 are dispersed with regularity within the display region in the plane of the display surface 10DS. The spacer portion 11 is formed of, for example, a substantially transparent photosensitive resin material, and is formed by being patterned through a known photolithography method in a manufacturing step of the CF substrate 10a. Furthermore, as shown in FIG. 6, the spacer portion 11 according to the present embodiment has a planar shape of a substantially regular octagon shape, but this is not necessarily the sole case, and for example, may be a polygonal shape, a substantially circular shape, an elliptical shape and the like other than the regular octagon shape. Not all of the great number of spacer portions 11 dispersed within the plane of the display surface 10DS are limited to being brought into contact to the array substrate 10b side, and for example, some spacer portions may be spaced apart and not brought into contact to the array substrate 10b side.

Figure 7:
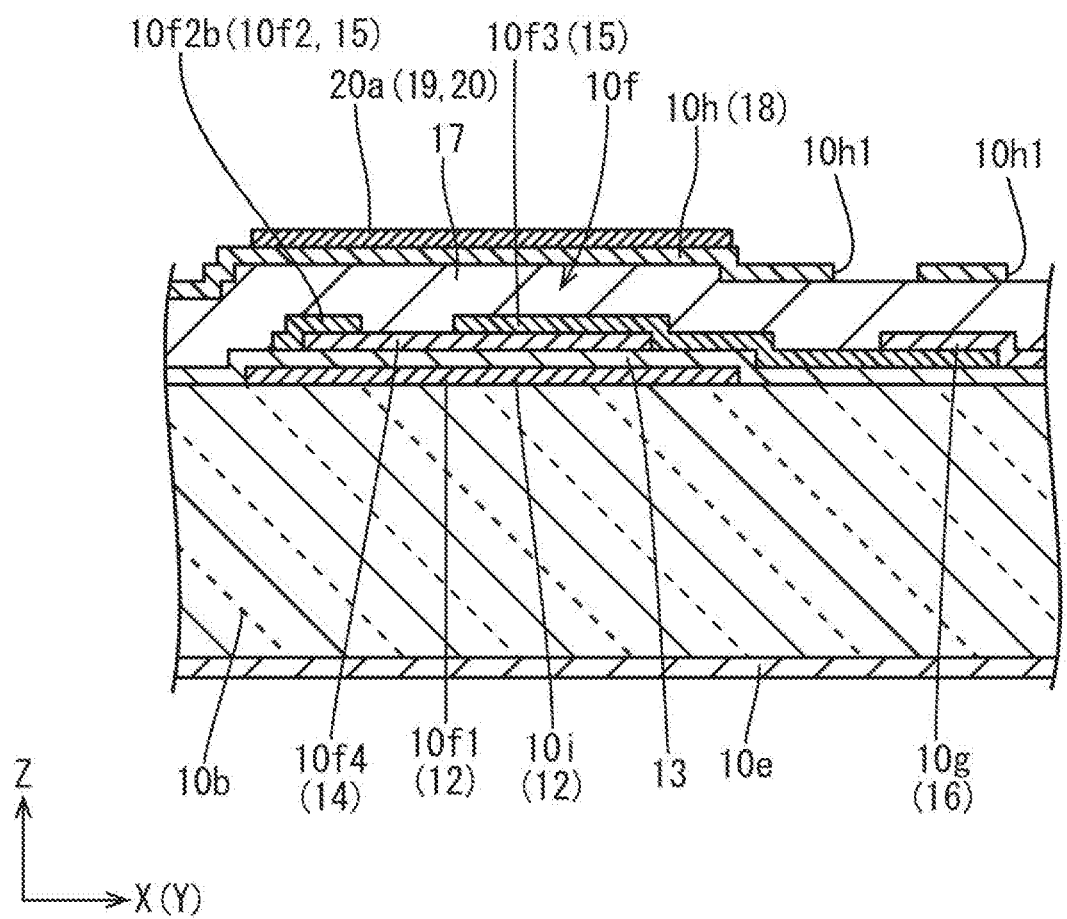
FIG. 7 is a cross-sectional view taken along line A-A in FIG. 6.

Next, various types of films stacked and formed on the inner surface side of the array substrate 10b will be described. As shown in FIG. 7, in the array substrate 10b, a first metal film (first conductive film) 12, a gate insulating film (insulating film, first insulating film) 13, a semiconductor film 14, a second metal film (second conductive film) 15, a first transparent electrode film (third conductive film, transparent electrode film) 16, an inter-layer insulating film (insulating film, second insulating film) 17, a second transparent electrode film (fourth conductive film, transparent electrode film) 18, a third metal film (fifth conductive film, light shielding film) 19, and an oriented film 10o are stacked and formed in order from the lower layer side (glass substrate side, side farther from the liquid crystal layer 10c).

The first metal film 12 is formed as a single layer film made of one type of metal material or a stacked film including different types of metal materials or alloy to have conductivity and light shielding property, and configures the gate line 10i, the gate electrode 10f1 of the TFT 10f, and the like, as shown in FIGS. 3 and 7. The gate insulating film 13 is formed of inorganic material such as silicon oxide film, silicon nitride film, and the like, and holds the first metal film 12 on the lower layer side and the semiconductor film 14 and the second metal film 15 on the upper layer side in an insulated state. The semiconductor film 14 includes a thin film using, for example, amorphous silicon and oxide semiconductor for the material, and configures a channel portion 10f4 and the like to be connected to the source electrode 10f2 and the drain electrode 10f3 in the TFT 10f. Similar to the first metal film 12, the second metal film 15 is formed as a single layer film or a stacked film or alloy made of one type or a plurality of types of metal materials to have conductivity and light shielding property, and configures the source line 10j, the source electrode 10f2 and the drain electrode 10f3 of the TFT 10f, and the like, as shown in FIGS. 2 and 7. The first transparent electrode film 16 is formed of a transparent electrode material (e.g., Indium Tin Oxide (ITO) etc.), and configures the pixel electrode 10g. The inter-layer insulating film 17 is formed of an inorganic material such as silicon oxide film and silicon nitride film, and holds the second metal film 15 and the first transparent electrode film 16 on the lower layer side and the second transparent electrode film 18 on the upper layer side in an insulated state. The second transparent electrode film 18 is formed of a transparent electrode material, similar to the first transparent electrode film 16, and configures a common electrode 10*h*. Similar to the first metal film 12 and the second metal film 15, the third metal film 19 is formed as a single layer film or a stacked film or alloy made of one type or a plurality of types of metal materials (e.g., Cu, Al, Mo, Ti, etc.) to have conductivity and light shielding property, and configures the light shielding portion 20, to be described later.

Now, the configuration of the TFT 10*f* will be described in detail. As shown in FIGS. 6 and 7, the TFT 10*f* includes a gate electrode 10/1 configured by a portion that intersects the source line 10*j* in the gate line 10*i* and a portion in which the relevant portion is made wider to both sides in the Y axis direction. In FIG. 6, the illustration of the common electrode 10*h* is omitted. The gate electrode 10/1 drives the TFT 10*f* based on a scan signal provided to the gate line 10*i*, and controls the current between the source electrode 10/2 and the drain electrode 10/3 to be described later. The TFT 10*f* includes the source electrode 10/2 including a portion superimposing the gate electrode 10/1 in the source line 10*j*. The source electrode 10/2 is configured by a first source electrode configuring portion 10/2*a* forming an obtuse angle with respect to a main body portion 10/1 of the source line 10*j* (portion not superimposing the gate electrode 10/1, the portion linearly extending along the Y axis direction) and extending along the diagonal direction with respect to the X axis direction and the Y axis direction, a second source electrode configuring portion 10/2*b* forming a substantially right angle with respect to the first source electrode configuring portion 10/2*a* and extending along the diagonal direction with respect to the X axis direction and the Y axis direction, and a third source electrode configuring portion 10/2*c* forming a substantially right angle with respect to the second source electrode configuring portion 10/2*b* and being parallel to the first source electrode configuring portion 10/2*a* and opposing the first source electrode configuring portion 10/2*a*, and has a channel form as a whole opened toward the pixel electrode 10*g* side when seen in plan view. The TFT 10*f* includes the drain electrode 10/3 arranged at a position with a gap between the drain electrode 10/3 and the source electrode 10/2. The drain electrode 10/3 is extended so as to be parallel to the first source electrode configuring portion 10/2*a* and the third source electrode configuring portion 10/2*c* configuring the source electrode 10/2, and is arranged at a position with a substantially equal gap with respect to each source electrode configuring portion 10/2*a* to 10/2*c*. In the drain electrode 10/3, an end derived from the open portion of the source electrode 10/2 is connected to the pixel electrode 10*g*, and the end on the opposite side from the pixel electrode 10*g* side is arranged at a substantially central position in the TFT 10*f*.

As shown in FIGS. 6 and 7, the TFT 10*f* includes a channel portion 10/4 consisting of a semiconductor film 14, and overlapping the gate electrode 10/1 by way of the gate insulating film 13 and connected to the source electrode 10/2 and the drain electrode 10/3. When the TFT 10*f* is turned ON based on the scan signal provided to the gate electrode 10/1, the image signal provided to the source line 10*j* is provided from the source electrode 10/2 to the drain electrode 10/3 through the channel portion 10/4 made of semiconductor material, and as a result, the pixel electrode 10*g* is charged. The channel portion 10/4 has a size that can fit within a forming range of the source electrode 10/2 when seen in plan view. That is, the channel portion 10/4 selectively includes a portion located between the source electrode 10/2 and the drain electrode 10/3, which are connecting targets when seen in plan view, and a portion that overlaps one part of each of the source electrode 10/2 and the drain electrode 10/3, and the semiconductor material to become the channel portion 10/4 barely has a portion protruding to the outer side from the outer shape of the source electrode 10/2. Therefore, when outside light (includes irradiation light of the backlight device) is irradiated on the curved display panel 10, such outside light (outside light also includes reflected light reflected between the first metal film 12 and the second metal film 15, etc.) is less likely to be irradiated on the semiconductor material to become the channel portion 10/4 on the source electrode 10/2 side. If the semiconductor material to become the channel portion has a portion protruding from the source electrode 10/2, when the irradiation light quantity of the outside light on the curved display panel 10 fluctuates, the capacitance value between the source electrode 10/2 and the gate electrode 10/1 fluctuates and a video signal fluctuates, whereby display failures may occur as a result. In regards to this point, as the outside light is less likely to be irradiated on the semiconductor material to become the channel portion 10/4 on the source electrode 10/2 side as described above, display failures are unlikely to occur even when the irradiation light quantity of the outside light with respect to the curved display panel 10 fluctuates. The channel portion 10/4 has a planar shape of a substantially diamond shape, where each side is parallel to the outer shape of the source electrode 10/2. The forming range of the TFT 10*f* according to the present embodiment coincides with the forming range of the gate electrode 10/1, the source electrode 10/2, the drain electrode 10/3 and the channel portion 10/4, and has a substantially diamond shape as a whole when seen in plan view. A central position of the TFT 10*f* substantially coincides with the intersecting center of the gate line 10*i* and the source line 10*j*.

Figure 8:
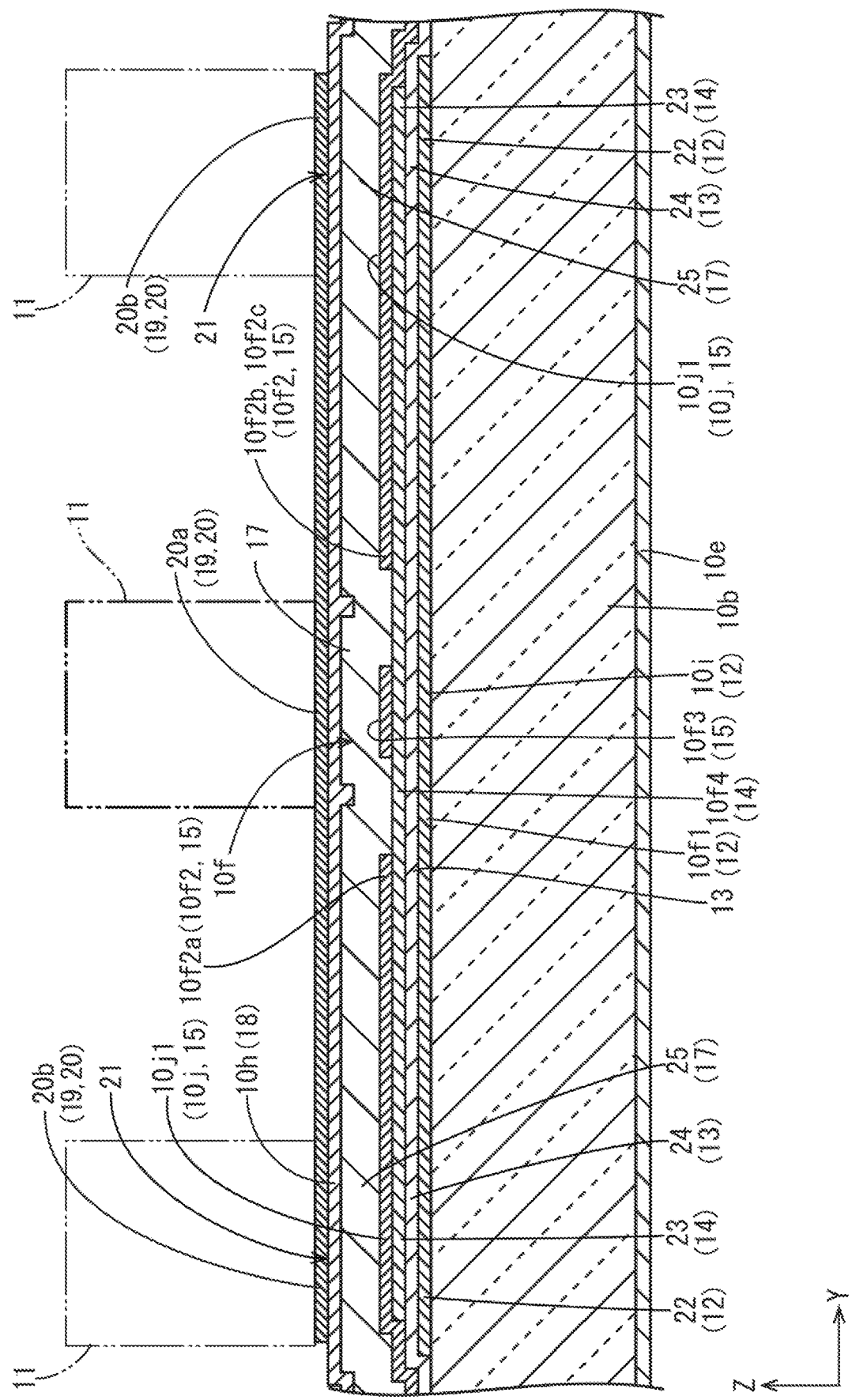
FIG. 8 is a cross-sectional view taken along line B-B in FIG. 6.

As shown in FIGS. 6 and 8, the array substrate 10*b* according to the present embodiment includes an extending portion 21 obtained by expanding the configuring elements omitting at least the drain electrode 10/3 of the TFT 10*f* from the forming range of the TFT 10*f*. As the extending portion 21 has a stacked structure substantially the same as the TFT 10*f*, a step difference is barely formed between the region superimposing the TFT 10*f* and the region superimposing the extending portion 21 in the inner surface of the array substrate 10*b* (surface on the liquid crystal layer 10*c* side, opposing surface with the CF substrate 10*a*, contacting surface of the spacer portion 11). The extending portion 21 is arranged to be adjacent to each other to the TFT 10*f* in the Y axis direction (curved direction). The extending portion 21 is arranged in pairs so as to be adjacent to each other on one side (e.g., upper side shown in FIG. 6) and the other side (e.g., lower side shown in FIG. 6) in the Y axis direction with respect to the TFT 10*f*. Therefore, in the array substrate 10*b*, one extending portion 21, the TFT 10*f* and the other extending portion 21 are sequentially lined to form a column along the Y axis direction, and the arrangement range becomes the range in which planarity of the inner surface is guaranteed in the array substrate 10*b*. The arrangement range of the TFT 10*f* and the extending portions 21 becomes a fluctuation tolerable range of the contacting position of the spacer portion 11 with respect to the array substrate 10*b* to be described later. The TFT 10*f* and the extending portions 21 are substantially symmetric in plan view with respect to the Y axis direction, and accompanying therewith, the pixel electrodes 10*g* are also substantially symmetric in plan view with respect to the Y axis direction. In FIG. 6, the arrangement range of the TFT 10*f* and each extending portion 21 is illustrated with an arrow.

Specifically, as shown in FIGS. 6 and 8, the extending portion 21 at least includes a gate electrode extending portion (electrode extending portion) 22 including the first metal film 12 (material) same as the gate electrode 10*f*1, which is the configuring element of the TFT 10*f*, and being arranged to be adjacent to each other to the gate electrode 10*f*1 in the Y axis direction, and a channel extending portion 23 including the semiconductor film 14 (material) same as the channel portion 10*f*4, which is the configuring element of the TFT 10*f*, and being arranged to be adjacent to each other to the channel portion 10*f*4 in the Y axis direction. The gate electrode extending portion 22 and the channel extending portion 23 overlap each other when seen in plan view, and also overlap a main body portion 10*j*1 of the source line 10*j* when seen in plan view. The gate electrode extending portion 22 is directly continued with respect to the gate electrode 10*f*1, where the width dimension (dimension in the X axis direction) is substantially the same as the width dimension of the gate electrode 10*f*1 but is larger than the width dimension of the source line 10*j*. Similar to the gate electrode extending portion 22, the channel extending portion 23 has an elongate square shape directly continuing to the channel portion 10*f*4 and linearly extending along the Y axis direction from the channel portion 10*f*4, where the width dimension is larger than the width dimension of the source line 10*j* and smaller than the width dimension of the gate electrode extending portion 22. The channel extending portion 23 is arranged such that the entire region overlaps the gate electrode extending portion 22. That is, the channel extending portion 23 is arranged such that the entire region overlaps the gate electrode extending portion 22, and does not include a portion that does not overlap the gate electrode extending portion 22, that is, a portion protruding to the outer side from the outer shape of the gate electrode extending portion 22. Therefore, when the outside light (in particular, irradiation light of the backlight device) is irradiated on the curved liquid crystal panel 10, such outside light is less likely to be irradiated on the channel extending portion 23. If the channel extending portion has a portion protruding to the outer side from the outer shape of the gate electrode extending portion 22, the irradiation light quantity with respect to the channel extending portion fluctuates when the irradiation light quantity of the outside light with respect to the curved liquid crystal panel 10 fluctuates, and accompanying therewith, the capacitance value between the source line 10*j* and the gate electrode extending portion 22 connected to the semiconductor film 14 to become the channel extending portion fluctuates and display failure may occur as a result. In regards to this point, as the outside light is less likely to be irradiated on the channel extending portion 23 as described above, display failures are unlikely to occur even when the irradiation light quantity of the outside light with respect to the curved display panel 10 fluctuates.

Furthermore, as shown in FIG. 8, the extending portion 21 at least includes, in addition to the gate electrode extending portion 22 and the channel extending portion 23, at least a first insulating portion 24 including the gate insulating film 13 and interposed between the gate electrode extending portion 22 and the channel extending portion 23, a main body portion 10*j*1 of the source line 10*j* arranged on the upper layer side of the first insulating portion 24 and including the second metal film 15, a second insulating portion 25 including the inter-layer insulating film 17 and interposed between the main body portion 10*j*1 of the source line 10*j* and the common electrode 10*h*, and the common electrode 10*h* including the second transparent electrode film 18. The main body portion 10*j*1 of the source line 10*j* is a structural object same as the source electrode 10*f*2 as it includes the second metal film 15 same as the source electrode 10*f*2 which is the configuring element of the TFT 10*f* and is directly continued to the source electrode 10*f*2. Therefore, the extending portion 21 can be said as including substantially all the configuring elements omitting the drain electrode 10*f*3 of the TFT 10*f*, and the stacked structure thereof is the same as the stacked structure of the TFT 10*f*. Thus, the planarity of the range extending from the TFT 10*f* to the extending portion 21 along the Y axis direction in the inner surface of the array substrate 10*b* is enhanced.

The spacer portion 11 according to the present embodiment will now be described in detail. As shown in FIGS. 3 and 4, the spacer portion 11 is arranged to overlap at least one of the TFT 10*f* and the extending portion 21 adjacent to each other in the Y axis direction (curved direction). In FIG. 4, the forming range of the spacer portion 11 and the inter-pixel light shielding portion 10*l* is shown with a chain double dashed line. The curved liquid crystal panel 10 has the display surface 10DS curved around the curved axis CAX from the flat state in manufacturing, and the contacting position (position seen in plan view) of the spacer portion 11 with respect to the array substrate 10*b* side may vary in the curved direction due to such deformation. In this regards, by adopting a design in which the spacer portion 11 overlaps at least one of the TFT 10*f* and the extending portion 21 as described above, a situation where the spacer portion 11 makes contact on the array substrate 10*b* side at a position that does not overlap neither the TFT 10*f* and the extending portion 21 is less likely to occur, and the reliability the spacer portion 11 makes contact on the array substrate 10*b* side at a position that overlaps either the TFT 10*f* and the extending portion 21 becomes high. As described above, the extending portion 21 is a portion that has a stacked structure (gate electrode extending portion 22, channel extending portion 23, etc.) same as the TFT 10*f* and barely has a step difference with the TFT 10*f*, where in the array substrate 10*b*, the planarity in the range from the TFT 10*f* to the extending portion 21 in the Y axis direction is high. Therefore, even if a step difference forms between the region superimposing the TFT 10*f* and the extending portion 21 and the region not superimposing the TFT 10*f* and the extending portion 21 in the array substrate 10*b*, the gap between the substrates 10*a*, 10*b* held by the spacer portion 11 is less likely to vary and stabilizes. Thus, unevenness is less likely to occur in the image displayed on the display surface 10DS.

Furthermore, in the present embodiment, as shown in FIGS. 6 and 8, the extending portions 21 are arranged to be adjacent to each other on one side and the other side in the Y axis direction with respect to the TFT 10*f*, and hence the fluctuation tolerable range in the contacting position of the spacer portion 11 with respect to the array substrate 10*b* is wider compared to a case in which one extending portion is arranged to be adjacent to each other on only one side in the Y axis direction with respect to the TFT 10*f*. Therefore, the variation in the contacting position of the spacer portion 11 with respect to the array substrate 10*b* involved in the curving of the curved liquid crystal panel 10 can be absorbed over a wider range, and hence the gap between the substrates 10*a*, 10*b* further stabilizes. More specifically, the length in which the TFT 10*f* and the extending portions 21 extend along the Y axis direction is a length that overlaps any of the TFT 10*f* and the extending portions 21 even if the position in the Y axis direction of the spacer portion 11 with respect to the array substrate 10b fluctuates with the curving of the curved liquid crystal panel 10. Specifically, even if the position of the spacer portion 11 with respect to the array substrate 10b fluctuates, for example, 30 µm in the Y axis direction and fluctuates, for example, 5 µm in the X axis direction with the curving of the curved liquid crystal panel 10, the spacer portion 11 overlaps any of the TFT 10f and the extending portions 21. Furthermore, in a case in which the contacting position of the spacer portion 11 with respect to the array substrate 10b is shifted to either the one side or the other side with respect to the TFT 10f in the curved direction due to the curved liquid crystal panel 10 being curved around the curved axis CAX, the reliability the spacer portion 11 is arranged to overlap either one of the extending portions 21 becomes high. Therefore, the degree of freedom of design in setting the curved shape of the curved liquid crystal panel 10 becomes high.

As shown in FIGS. 6 and 8, among the spacer portions 11 dispersed within the plane of the display surface 10DS, the spacer portion 11 arranged at a position closest to the curved axis CAX in the Y axis direction (curved direction) is brought into contact at the central position of the TFT 10f in the array substrate 10b. The central position of the TFT 10f substantially coincides with the intersecting center of the gate line 10i and the source line 10j, as described above, and is a position where the distance is the same from both of the extending portions 21. The curved axis CAX is arranged to traverse the central position in the long side direction of the curved liquid crystal panel 10 when seen in plan view (see FIG. 1). Therefore, the spacer portion 11 arranged at a position closest to the curved axis CAX in the Y axis direction can be said as being arranged at the central position in the long side direction of the curved liquid crystal panel 10. In the spacer portion 11 arranged at a position closest to the curved axis CAX in the Y axis direction (central position in the long side direction of the curved liquid crystal panel 10), the contacting position with respect to the array substrate 10b side barely changes in the Y axis direction between before and after the curved liquid crystal panel 10 is curved in the manufacturing process, and even if change occurs, the amount of change is a minimum. In FIGS. 6 and 8, the spacer portion 11 arranged at a position closest to the curved axis CAX in the Y axis direction is illustrated with a thick chain double dashed line. On the other hand, in the spacer portion 11 arranged at a position farther from the curved axis CAX in the Y axis direction than the spacer portion 11 described above, the contacting position with respect to the array substrate 10b side changes in the Y axis direction between before and after the curved liquid crystal panel 10 is curved in the manufacturing process, and the amount of change tends to be proportional to the distance from the curved axis CAX. In FIGS. 6 and 8, the spacer portion 11 arranged at a position farthest from the curved axis CAX in the Y axis direction, that is, at both end positions in the long side direction of the curved liquid crystal panel 10 is illustrated with a thin chain double dashed line. As the spacer portion 11 arranged at a position closest to the curved axis CAX in the Y axis direction is brought into contact to the central position of the TFT 10f in the array substrate 10b, even if the position of making contact with respect to the array substrate 10b changes according to the arrangement in the Y axis direction with respect to the curved axis CAX in the other spacer portion 11, the reliability of superimposing any of the TFT 10f and the extending portions 21 becomes high. Thus, the gap between the substrates 10a, 10b held by the spacer portions 11 is more unlikely to vary. All of the spacer portions 11 dispersed within the plane of the display surface 10DS are arranged to overlap the central position of the TFT 10f in the array substrate 10b before the curved liquid crystal panel 10 is curved in the manufacturing process, that is, in a state the display surface 10DS is flat.

Furthermore, as shown in FIGS. 6 and 8, the array substrate 10b includes the light shielding portion 20 including the third metal film 19 having light shielding property and conductivity. The light shielding portion 20 is configured by an array side inter-electrode light shielding portion (inter-electrode light shielding portion) 20a arranged to straddle both the source electrode 10f2 and the drain electrode 10f3 connected through the channel portion 10f4 in each TFT 10f, an extended light shielding portion 20b obtained by expanding the array side inter-electrode light shielding portion 20a in the Y axis direction, and a coupling light shielding portion 20c that couples the array side inter-electrode light shielding portions 20a adjacent to each other in the X axis direction. In FIG. 6, the forming range of the light shielding portion 20 is illustrated in a hatched form. A great number of array side inter-electrode light shielding portions 20a are lined in a matrix form at intervals in the X axis direction and the Y axis direction, similar to each TFT 10f within the plate surface of the array substrate 10b. The array side inter-electrode light shielding portion 20a has an outer shape parallel to the outer shape of the channel portion 10f4 in the TFT 10f and has a substantially diamond shape when seen in plan view. In the array side inter-electrode light shielding portion 20a, the forming range when seen in plan view is wider than the forming range of the channel portion 10f4, and it is arranged to overlap substantially the entire region of the source electrode 10f2 and the drain electrode 10f3 when seen in plan view, in addition to the entire region of the portion between the source electrode 10f2 and the drain electrode 10f3. According to such a configuration, the outside light can be suppressed from being irradiated on the channel portion 10f4 consisting of the semiconductor material located at the portion between the source electrode 10f2 and the drain electrode 10f3. Thus, the fluctuation in the properties of the TFT 10f, in particular, the leak current that may occur in the TFT 10f in the OFF state can be reduced. Furthermore, as the array side inter-electrode light shielding portion 20a is provided in the array substrate 10b together with the TFT 10f to be light shielded, positional misalignment with respect to the TFT 10f due to the curved liquid crystal panel 10 being curved around an axis of curvature is avoided, so that the reliability of appropriately exhibiting the light shielding performance becomes high.

As shown in FIGS. 6 and 8, the extended light shielding portion 20b is arranged in pairs so as to be adjacent to each other on one side (e.g., upper side shown in FIG. 6) and the other side (e.g., lower side shown in FIG. 6) in the Y axis direction with respect to the array side inter-electrode light shielding portion 20a. Therefore, in the array substrate 10b, one extended light shielding portion 20b, the array side inter-electrode light shielding portion 20a and the other extended light shielding portion 20b are sequentially lined to form a column along the Y axis direction. The array side inter-electrode light shielding portion 20a is arranged to overlap the main part of the TFT 10f when seen in plan view, and the extended light shielding portions 20b are arranged to overlap the main part of the extending portions 21, respectively, when seen in plan view. More specifically, the extended light shielding portion 20b has an elongate square shape linearly extending along the Y axis direction from the array side inter-electrode light shielding portion 20a to overlap the central portion in the X axis direction in the extending portion 21, where the width dimension is larger than the width dimension of the channel extending portion 23 configuring the extending portion 21. Therefore, the extended light shielding portion 20b is arranged to overlap substantially the entire region of the main body portion 10j1 of the source line 10j and the channel extending portion 23 in the extending portion 21 when seen in plan view, and is brought into direct contact with the common electrode 10h in the extending portion 21. Thus, the extended light shielding portion 20b, which is a structural object same as the array side inter-electrode light shielding portion 20a stacked on the TFT 10f, is stacked on the extending portion 21, whereby the stacked structure of the extending portion 21 and the stacked structure of the TFT 10f become equal and a step difference that may occur in between is alleviated. Thus, even when the position of the spacer portion 11 with respect to the array substrate 10b is either the region superimposing the TFT 10f and the region superimposing the extending portion 21, or crosses both regions, variation is less likely to occur in the gap between the substrates 10a, 10b.

As shown in FIGS. 6 and 8, the coupling light shielding portion 20c is arranged to linearly extend along the X axis direction from the array side inter-electrode light shielding portion 20a. The coupling light shielding portion 20c is arranged to overlap the gate line 10i when seen in plan view, where the width dimension (dimension in the Y axis direction) is smaller than the width dimension of the gate line 10i. The coupling light shielding portion 20c is arranged to be interposed between the array side inter-electrode light shielding portions 20a lined at intervals in the X axis direction, and is coupled to the array side inter-electrode light shielding portion 20a to which both ends in the extending direction (X axis direction) are adjacent. Thus, the array side inter-electrode light shielding portion 20a superimposing each TFT 10f arranged on the same gate line 10i are all coupled by each coupling light shielding portion 20c. The third metal film 19 constituting the light shielding portion 20 has light shielding property and conductivity, and is stacked so as to be brought into direct contact with the second transparent electrode film 18. That is, the light shielding portion 20 is conduction connected with respect to the common electrode 10h. The light shielding portion 20 can achieve lower resistance of the conduction connected common electrode 10h as each array side inter-electrode light shielding portion 20a is coupled by each coupling light shielding portion 20c, and the extended light shielding portions 20b are respectively continued to each array side inter-electrode light shielding portion 20a. The common electrode 10h thus can be stably held at the reference potential, whereby occurrence of display failure such as shadowing is suppressed.

On the other hand, as shown in FIGS. 5 and 6, a CF side inter-electrode light shielding portion (other side inter-electrode light shielding portion) 26 is provided on the CF substrate 10a to overlap a range crossing both the source electrode 10f2 and the drain electrode 10f3 connected through the channel portion 10f4 in the TFT 10f on the array substrate 10b side. The CF side inter-electrode light shielding portion 26 is provided integrally with the inter-pixel light shielding portion 101 by partially widening the inter-pixel light shielding portion 101 provided as an existing structure on the CF substrate 10a. Specifically, the CF side inter-electrode light shielding portion 26 is formed by widening the portion superimposing the TFT 10f in the inter-pixel light shielding portion 10l, and thus is arranged to overlap even one part of the source electrode 10f2 and the drain electrode 10f3 in addition to the entire region of the portion to become the portion between the source electrode 10f2 and the drain electrode 10f3 in the TFT 10f when seen in plan view. According to such a configuration, the outside light can be suppressed from being irradiated on the channel portion 10f4 formed of a semiconductor material located at the portion to become the portion between the source electrode 10f2 and the drain electrode 10f3. Thus, fluctuation in characteristics of the TFT 10f, in particular, the leakage current that may occur in the TFT 10f in the OFF state can be reduced.

Furthermore, as described above, as shown in FIGS. 3 and 5, the color filter 10k provided on the CF substrate 10a is extended along the Y axis direction (curved direction) and is arranged to straddle a plurality of pixel electrodes 10g adjacent to each other in the Y axis direction, so that even if the arrangement of the color filter 10k with respect to the pixel electrode 10g of the array substrate 10b varies in the Y axis direction due to the curving of the curved liquid crystal panel 10, the color filters 10k exhibiting different colors are lined along the X axis direction and are arranged so that each color filter is extended along the Y axis direction and straddle the pixel electrodes 10g. Thus, the mixing of color caused by the curving of the display surface 10DS is less likely to occur.

As described above, the curved liquid crystal panel (curved display panel) 10 of the present embodiment is a curved liquid crystal panel 10 in which the display surface 10DS that displays images is curved around at least the curved axis (at least one axis of curvature) CAX, and includes substrates 10a, 10b arranged so that the plate surfaces thereof face each other with a gap, a TFT (switching component) 10f arranged on the array substrate (first substrate) 10b of the substrates 10a, 10b and at least includes the source electrode 10f2 and the drain electrode 10f3 to control the current between the source electrode 10f2 and the drain electrode 10f3, an extending portion 21 obtained by expanding the configuring element omitting at least the drain electrode 10f3 of the TFT 10f from the forming range of the TFT 10f in the array substrate 10b and arranged to be orthogonal to the curved axis CAX with respect to the TFT 10f and adjacent in the curved direction along the display surface 10DS, and a spacer portion 11 arranged on the CF substrate (second substrate) 10a of the substrates 10a, 10b to hold the gap between the substrates 10a, 10b, the spacer portion being arranged to overlap at least one of the TFT 10f and the extending portion 21 adjacent to each other.

Thus, an image is displayed on the curved display surface 10DS by controlling the current between the source electrode 10f2 and the drain electrode 10f3 in the TFT 10f. The gap between the substrates 10a, 10b can be held by the spacer portion 11 provided on the CF substrate 10a of the substrates 10a, 10b in which the respective plate surfaces face each other with a gap. The position of the spacer portion 11 with respect to the array substrate 10b may vary in the curved direction as the curved liquid crystal panel 10 is curved around the curved axis CAX, and hence the gap between the substrates 10a, 10b held by the spacer portion 11 may also vary.

In regards to this, on the array substrate 10b, the extending portion 21 is arranged so as to be adjacent to each other in the curved direction with respect to the TFT 10f, the extending portion 21 being obtained by expanding the configuring element omitting at least the drain electrode 10f3 of the TFT 10f from the forming range of the TFT 10f, and the spacer portion 11 is arranged to overlap at least one of the TFT 10f and the extending portion 21. Thus, even if the position of the spacer portion 11 with respect to the array substrate 10b varies in the curved direction due to the curved liquid crystal panel 10 being curved around the curved axis CAX, a situation where the spacer portion 11 is arranged so as not to overlap neither the TFT 10f and the extending portion 21 is less likely to occur, and the reliability the spacer portion 11 is arranged to overlap either the TFT 10f and the extending portion 21 becomes high. Therefore, even if a step difference forms between the region superimposing the TFT 10f and the extending portion 21 in the array substrate 10b and the region not superimposing the TFT 10f and the extending portion 21, the gap between the substrates 10a, 10b held by the spacer portion 11 is less likely to vary and stabilizes, so that unevenness is less likely to occur in the image displayed on the display surface 10DS.

Furthermore, the array substrate 10b is provided with at least a gate line (first line) 10i extending along the curved axis CAX and a source line (second line) 10j extending along the curved direction, and the TFT 10f at least includes the gate electrode 10f1 connected to the gate line 10i, and the channel portion 10f4 formed of a semiconductor material and overlapping the gate electrode 10f1 through the gate insulating film (insulating film) 13 and connected to the source electrode 10f2 and the drain electrode 10f3, where the source electrode 10f2 is connected to the source line 10j, and the extending portion 21 at least includes the gate electrode extending portion (electrode extending portion) 22 formed of a material same as the gate electrode 10f1 connected to the gate line 10i and arranged so as to be adjacent to each other in the curved direction with respect to the gate electrode 10f1 and overlap a part of the source line 10j, and a channel extending portion 23 formed of a material same as the channel portion 10f4 and arranged so as to be adjacent to each other in the curved direction with respect to the channel portion 10f4 and overlap a part of the source line 10j and the gate electrode extending portion 22. Thus, with the TFT 10f being driven based on a signal provided from the gate line 10i and the source line 10j to the gate electrode 10f1 and the source electrode 10f2, and the image signal being provided from the source electrode 10f2 to the drain electrode 10f3 through the channel portion 10f4, the image is displayed on the curved display surface 10DS. The extending portion 21 at least includes the gate electrode extending portion 22 and the channel extending portion 23 obtained by expanding the gate electrode 10f1 and the channel portion 10f4 which are configuring elements omitting the drain electrode 10f3 of the TFT 10f, and is arranged to overlap a part of the source line 10j, so that a step difference barely forms between the region superimposing the TFT 10f in the array substrate 10b and the region superimposing the extending portion 21. Thus, the gap between the substrates 10a, 10b held by the spacer portion 11 is less likely to vary.

Furthermore, the channel extending portion 23 is arranged so as to continue to the channel portion 10f4 and so that the entire region overlaps the gate electrode extending portion 22. Thus, the channel extending portion 23 is arranged such that the entire region overlaps the gate electrode extending portion 22, and does not have a portion that does not overlap the gate electrode extending portion 22, that is, a portion protruding to the outer side from the outer shape of the gate electrode extending portion 22. Therefore, when the outside light (in particular, irradiation light of the backlight device) is irradiated on the curved liquid crystal panel 10, such outside light is less likely to be irradiated on the channel extending portion 23. If the channel extending portion has a portion protruding to the outer side from the outer shape of the gate electrode extending portion 22, when the irradiation light quantity of the outside light with respect to the curved liquid crystal panel 10 fluctuates, the irradiation light quantity with respect to the channel extending portion 23 also fluctuates, and accompanying therewith, the capacitance value between the source line 10j connected to the semiconductor film 14 to become the channel extending portion 23 and the gate electrode extending portion 22 fluctuates, and as a result, display failure may occur. In regards to this, the outside light is less likely to be irradiated on the channel extending portion 23 as described above, so that display failure is less likely to occur even if the irradiation light quantity of the outside light with respect to the curved liquid crystal panel 10 fluctuates.

The TFT 10f at least includes the channel portion 10f4 formed of a semiconductor material and connected to the source electrode 10f2 and the drain electrode 10f3, and the array side inter-electrode light shielding portion (inter-electrode light shielding portion) 20a arranged to straddle at least both the source electrode 10f2 and the drain electrode 10f3 is provided on the array substrate 10b. Thus, the image signal is provided from the source electrode 10f2 to the drain electrode 10f3 through the channel portion 10f4 formed of a semiconductor material. As the array side inter-electrode light shielding portion 20a is arranged to straddle both the source electrode 10f2 and the drain electrode 10f3, the outside light can be suppressed from being irradiated on the channel portion 10f4 formed of the semiconductor material located at the portion between the source electrode 10f2 and the drain electrode 10f3. Thus, the fluctuation in characteristics of the TFT 10f, in particular, the leakage current that may generate in the TFT 10f in the OFF state can be reduced. Furthermore, as the array side inter-electrode light shielding portion 20a is provided on the array substrate 10b along with the TFT 10f to be light shielded, positional misalignment with respect to the TFT 10f due to the curved liquid crystal panel 10 being curved around the curved axis CAX is avoided, so that the reliability of appropriately exhibiting the light shielding performance becomes high.

The array substrate 10b is provided with an expanded light shielding portion 20b obtained by expanding the array side inter-electrode light shielding portion 20a and arranged to at least partially overlap the extending portion 21. The array side inter-electrode light shielding portion 20a is arranged to at least partially overlap the TFT 10f. As the extended light shielding portion 20b obtained by expanding the array side inter-electrode light shielding portion 20a is arranged to at least partially overlap the extending portion 21, a step difference that may form between the region superimposing the TFT 10f in the array substrate 10b and the region superimposing the extending portion 21 is alleviated as compared with a case in which the extended light shielding portion is not provided. Thus, even if the position of the spacer portion 11 with respect to the array substrate 10b becomes either the region superimposing the TFT 10f or the region superimposing the extending portion 21, or even if crossing both regions, the gap between the substrates 10a, 10b is less likely to vary.

Furthermore, the TFT 10f and the array side inter-electrode light shielding portion 20a is arranged in plurals at intervals for at least one of the axial direction of the curved axis CAX and the curved direction, the array substrate 10b is provided with at least the pixel electrode 10g connected to the drain electrode 10f3, the common electrode 10h arranged to overlap the pixel electrode 10g through the inter-layer insulating film (insulating film) 17 and to which the reference potential is supplied, and the coupling light shielding portion 20c that couples the array side inter-electrode light shielding portions 20a arranged at intervals for at least one of the axial direction of the curved line CAX and the curved direction, and the array side inter-electrode light shielding portion 20a and the coupling light shielding portion 20c are made from a material having light shielding property and conductivity and are arranged to make contact with the common electrode 10h. Thus, the pixel electrode 10g is charged with the provision of the image signal from the source electrode 10f2 to the drain electrode 10f3 of the TFT 10f. A potential difference based on the voltage value charged in the pixel electrode 10g occurs between the common electrode 10h supplied with the reference potential and the pixel electrode 10g, and a predetermined tone is displayed on the display surface 10DS based on such potential difference. The coupling light shielding portion 20c couples the array side inter-electrode light shielding portions 20a arranged at intervals for at least one of either the axial direction of the curved axis CAX and the curved direction, and is made from a material having light shielding property and conductivity with the array side inter-electrode light shielding portion 20a and arranged to make contact with the common electrode 10h, thus realizing lower resistance of the common electrode 10h. Thus, the common electrode 10h is stably maintained at the reference potential, whereby occurrence of display failures such as shadowing is suppressed.

The extending portion 21 is arranged in pairs so as to be adjacent to each other on one side and the other side in the curved direction with respect to the TFT 10f. Thus, the extending portions 21 are arranged adjacent to each other on one side and the other side in the curved direction with respect to the TFT 10f, and such arrangement range becomes the fluctuation tolerable range of the position of the spacer portion 11 with respect to the array substrate 10b. Therefore, the variation in the position of the spacer portion 11 with respect to the array substrate 10b involved in the curving of the curved liquid crystal panel 10 can be absorbed over a wider range, and hence the gap between the substrates 10a, 10b further stabilizes. Furthermore, even when the position of the spacer portion 11 with respect to the array substrate 10b is shifted to either the one side or the other side in the curved direction with respect to the TFT 10f due to the curved liquid crystal panel 10 being curved around the curved axis CAX, the reliability in which the spacer portion 11 is arranged to overlap one of the extending portions 21 becomes high. Therefore, the degree of freedom of design in setting the curved shape of the curved liquid crystal panel 10 becomes high.

Furthermore, a plurality of spacer portions 11 are dispersed within a plane of the display surface 10DS, and among the spacer portions 11, the spacer portion 11 arranged at a position closest to the curved axis CAX in the curved direction is located at the center of the TFT 10f in the array substrate 10b. Thus, the gap between the substrates 10a, 10b is satisfactory held by the spacer portions 11 dispersed within the plane of the display surface 10DS. Among the spacer portions 11, the spacer portion 11 arranged at a position closest to the curved axis CAX in the curved direction barely has the position with respect to the array substrate 10b changed in the curved direction between before and after the curved liquid crystal panel 10 is curved, and even if such position is changed, the change amount is assumed to be a minimum. As the spacer portion 11 arranged at a position closest to the curved axis CAX in the curved direction is located at the center of the TFT 10f in the array substrate 10b, even when the position with respect to the array substrate 10b is changed according to the arrangement of each spacer portion 11 in the curved direction with respect to the curved axis CAX, the reliability of superimposing at least one of the TFT 10f and the extending portions 21 becomes high. Thus, the gap between the substrates 10a, 10b held by the spacer portions 11 is less likely to vary.

In the array substrate 10b, the pixel electrode 10g connected to the drain electrode 10f3 is provided so as to be lined in plurals along the axial direction of the curved axis CAX and the curved direction, and in the CF substrate 10a, the color filters 10k exhibiting different colors from each other are provided along the axial direction of the curved axis CAX so as to overlap the pixel electrodes 10g, where the color filters 10k are extended along the curved direction and are arranged to straddle the pixel electrodes 10g lined along the curved direction. Thus, when the pixel electrode 10g is charged as the image signal is provided from the source electrode 10f2 to the drain electrode 10f3 of the TFT 10f, the transmitting light quantity of each color filter 10k is controlled based on the voltage value, and hence color display of a predetermined tone is made on the display surface 10DS. Even when the arrangement of the color filter 10k with respect to the pixel electrode 10g of the array substrate 10b is varied in the curved direction due to the curved liquid crystal panel 10 being curved, the color filters 10k exhibiting different colors are lined along the axial direction of the curved axis CAX and each of the color filters is extended along the curved direction and arranged so as to straddle the pixel electrodes 10g lined along the curved direction, so that mixing of color is less likely to occur.

Second Embodiment

A second embodiment of the present invention will be described with reference to FIG. 9 or 10. In the second embodiment, that in which an installation mode of an extending portion 121 is changed is shown. Redundant description will be omitted on the structure, operation, and effect similar to the first embodiment described above.

Figure 9:
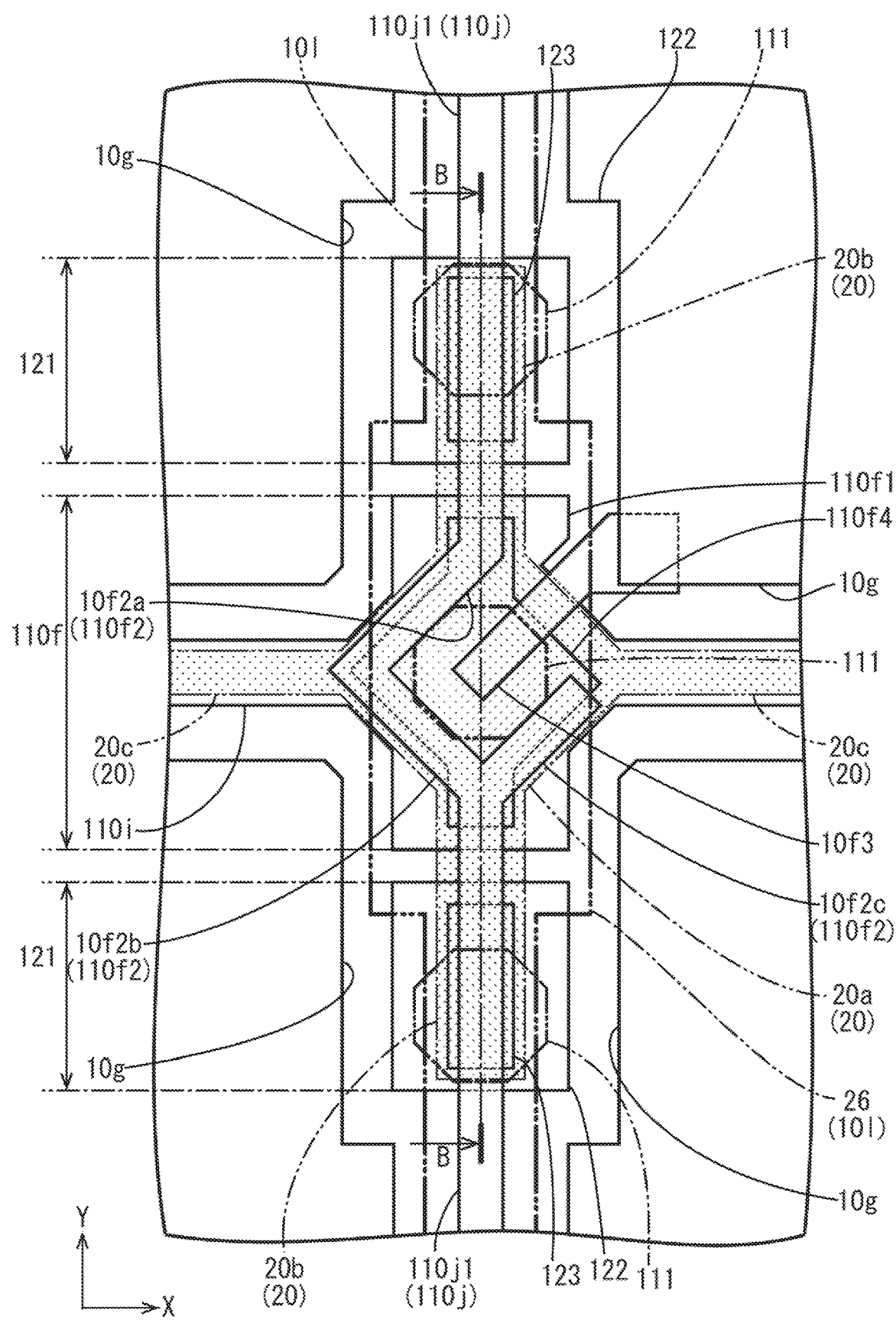
FIG. 9 is a plan view in which a vicinity of a TFT in a display region of an array substrate according to a second embodiment of the present invention is enlarged.
Figure 10:
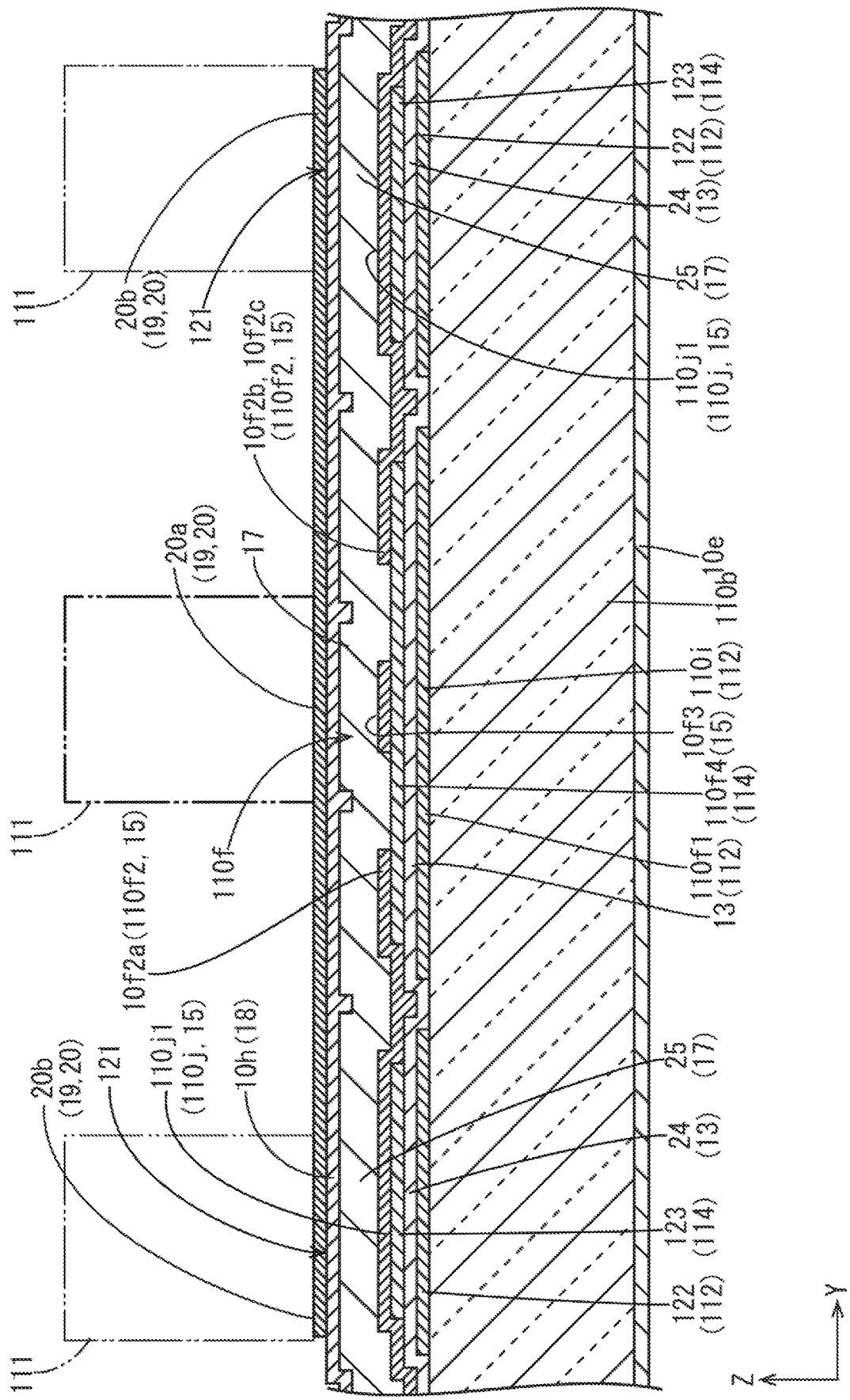
FIG. 10 is a cross-sectional view taken along line B-B in FIG. 9.

As shown in FIGS. 9 and 10, the extending portion 121 according to the present embodiment is arranged separated from a TFT 110f at a position with a gap in the Y axis direction with respect to the TFT 110f. That is, the extending portion 121 has an island form physically and electrically independent from the TFT 110f. Specifically, a gate electrode extending portion 122 and a channel extending portion 123 configuring the extending portion 121 are separated from a gate electrode 110f1 and a channel portion 110f4 configuring the TFT 110f. Therefore, when the scan signal is provided to a gate line 110i, the gate electrode 110f1 of the TFT 110f becomes the same potential as the gate line 110i and turns ON the TFT 110f, but the gate electrode extending portion 122 is electrically irrelevant to the gate line 110i and the gate electrode 110f1, and hence does not receive supply of current therefrom. Similarly, when the image signal provided to the source line 110j is provided from the source electrode 110f2 to the channel portion 110f4 of the TFT 110f, the channel extending portion 123 is electrically irrelevant to the channel portion 110f4, and hence does not receive supply of current from the channel portion 110f4. Thus, the extending portion 121 is avoided from forming a parasitic capacitance with a main body portion 110j1 of the source line 110j to overlap, and thus signal blunt is less likely to occur in the image signal transmitted to the source line 110j.

Furthermore, in the extending portion 121, the gap formed with the TFT 110f is smaller than a radial dimension of the spacer portion 111. Specifically, the gap formed between the extending portion 121 and the TFT 110f is, for example, about 3 μm, and the radial dimension of the spacer portion 111 is smaller as compared with when assumed as, for example, about 12 µm. Thus, a portion between the TFT 1110f and the extending portion 121 adjacent to each other in the Y axis direction has a step difference due to the presence or absence of the first metal film 112 and the semiconductor film 114 with respect to the TFT 110f and the extending portion 121. On the other hand, if the gap between the TFT 110f and the extending portion 121 is smaller than the radial dimension of the spacer portion 111, when the spacer portion 111 is brought into contact with the array substrate 110b side so as to overlap the portion between the TFT 110f and the extending portion 121, one part of the spacer portion 111 is brought into contact with the array substrate 110b side to overlap both the TFT 110f and the extending portion 121 adjacent to each other. Therefore, the gap holding function by the spacer portion 111 is appropriately exhibited, and the gap between the substrates is less likely to vary. In the present embodiment, the illustration of the CF substrate is omitted. Furthermore, in FIGS. 9 and 10, the spacer portion 111 arranged at a position closest to the curved axis in the X axis direction is illustrated with a thick chain double-dashed line, and the spacer portion 111 at a position farthest from the curved axis in the X axis direction, that is arranged at both end positions in the long side direction of the curved liquid crystal panel is illustrated with a thin chain double-dashed line.

According to the present embodiment described above, the array substrate 110b is provided with at least the gate line 110i extending along the curved axis and connected to the TFT 110f, and the source line 110j extending along the curved direction and connected to the TFT 110f, and arranged to at least partially overlap the extending portion 121, where the extending portion 121 is arranged separated from the TFT 110f at a position with a gap in the curved direction with respect to the TFT 110f. If the extending portion is continued to the TFT 110f and the electrically connected to the gate line 110i, parasitic capacitance forms between the source line 110j and the portion connected to the gate line 110i in the extending portion 121 superimposing the source line 110j, and signal blunt may occur in the signal transmitted to the source line 110j. In regards to this, the extending portion 121 superimposing the source line 110j is electrically separated from the gate line 110i connected to the TFT 110f, so that the parasitic capacitance that may occur between the source line 110j and the extending portion 121 is reduced and the signal blunt is less likely to occur in the signal transmitted to the source line 110j.

Furthermore, in the extending portion 121, the gap with the TFT 110f is smaller than the dimension in the curved direction in the spacer portion 111. The portion between the TFT 110f and the extending portion 121 adjacent to each other has a step difference with respect to the TFT 110f and the extending portion 121. Even when the spacer portion 111 is arranged to overlap the portion between the TFT 110f and the extending portion 121, one part of the spacer portion 111 overlaps at least one of the TFT 110f and the extending portion 121. Therefore, the gap holding function by the spacer portion 111 is appropriately exhibited and the gap between the substrates is less likely to vary.

Third Embodiment

A third embodiment of the present invention will be described with reference to FIGS. 11 to 15. In the third embodiment, that in which a manner of curving in a curved liquid crystal panel 210, and the like is changed from the first embodiment described above is shown. Redundant description will be omitted on the structure, operation, and effect similar to the first embodiment described above.

Figure 11:
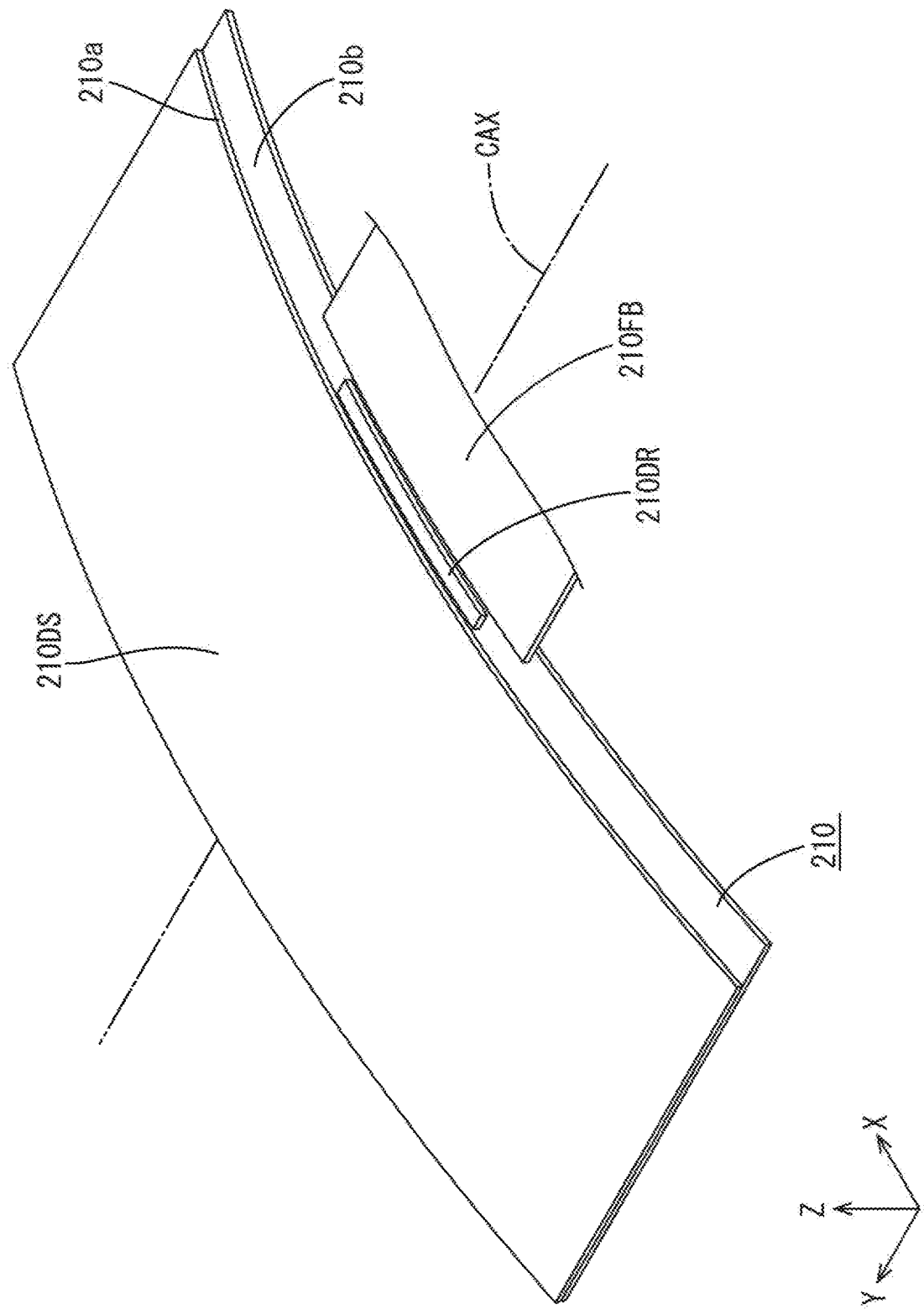
FIG. 11 is a schematic perspective view of a curved liquid crystal panel according to a third embodiment of the present invention.

As shown in FIG. 11, the curved liquid crystal panel 210 according to the present embodiment has a laterally long square shape as a whole. The curved liquid crystal panel 210 has a short side direction coinciding with the Y axis direction of each figure, a long side direction coinciding with the X axis direction of each figure, and a plate thickness direction coinciding with the Z axis direction of each figure. The curved axis CAX in the curved liquid crystal panel 210 has the axial direction thereof coinciding with the short side direction (Y axis direction) of the curved liquid crystal panel 210, and a curved direction (direction in which the curvature of a display surface 210DS changes) which is a direction orthogonal to the curved axis CAX and lying along the display surface 210DS coincides with the long side direction (X axis direction) of the curved liquid crystal panel 210. A CF substrate 210a configuring the curved liquid crystal panel 210 is laminated with one end in the short side direction aligned with respect to an array substrate 210b, the short side dimension of the CF substrate 210a being shorter than the short side dimension of the array substrate 210b. Therefore, the other end in the short side direction of the array substrate 210b projects out to the side with respect to the CF substrate 210a, and a driver 210DR and a flexible substrate 210FB are connected to the projected portion.

Figure 12:
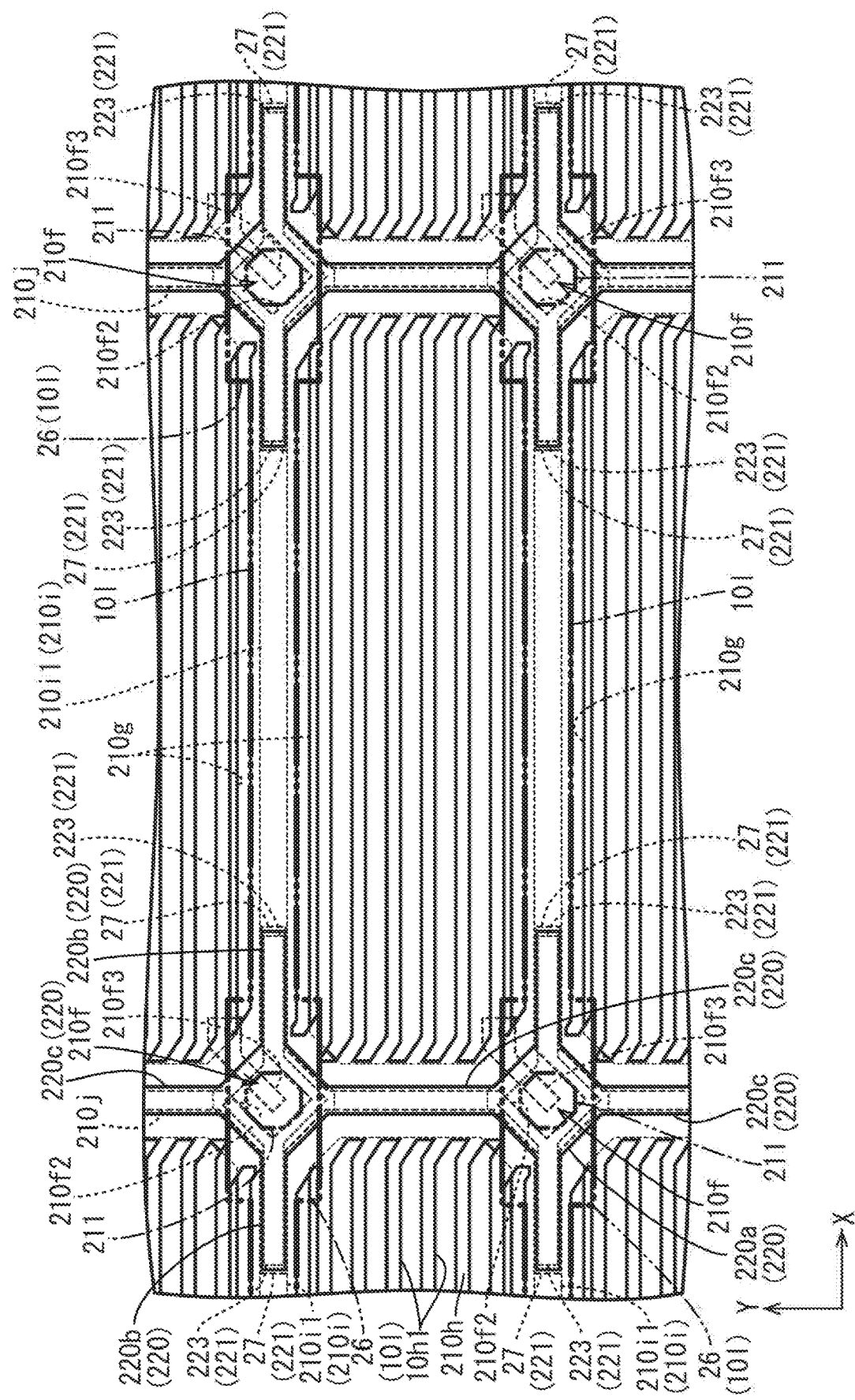
FIG. 12 is a plan view showing a line configuration in a display region of an array substrate.

In the present embodiment, the pixel electrode 210g provided on the array substrate 210b has a laterally long shape, as shown in FIG. 12, where the long side direction thereof coincides with the X axis direction (curved direction) and the short side direction coincides with the Y axis direction (axial direction of curved axis CAX). A source line (first line) 210j is extended along the Y axis direction which is the short side direction of the pixel electrode 210g, and a gate line (second line) 210i is extended along the X axis direction which is the long side direction of the pixel electrode 210g. Thus, as the source lines 210j are extended along the short side direction of the pixel electrode 210g and arranged at intervals in the long side direction of the pixel electrode 210g, the arrangement interval of the source lines 210j in the X axis direction becomes about a ratio (e.g., about ⅓) in which the short side dimension of the pixel electrode 210g is divided by the long side dimension, and accompanying therewith, the installing number of source lines 210j per unit length in the X axis direction becomes about the ratio (e.g., about ⅓) similar to the above, as compared to the first embodiment described above. Thus, the installing number of source lines 210j can be reduced, whereby the number of image signals to be provided to the source line 210j is reduced, and hence the manufacturing cost of the curved liquid crystal panel 210 can be reduced.

Figure 13:
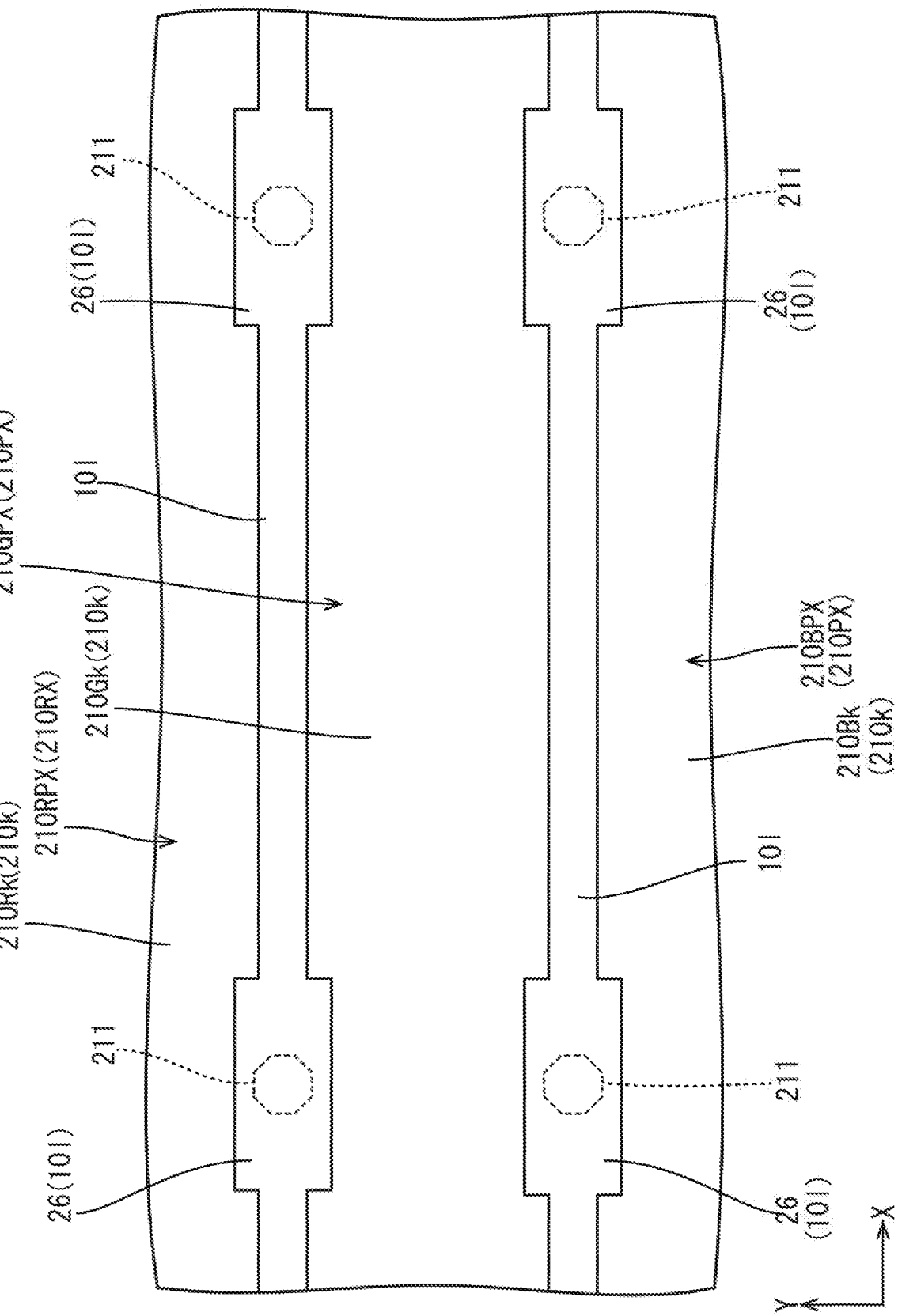
FIG. 13 is a plan view showing a configuration in a display region of a CF substrate.

With the array substrate 210b side being configured as above, the CF substrate 210a has the following configuration. In other words, as shown in FIGS. 12 and 13, a color filter 210k provided on the CF substrate 210a has filters of three colors exhibiting different colors from each other extending along the X axis direction and being repeatedly arranged along the Y axis direction, where the arrangement in the Y axis direction matches the arrangement of the pixel electrodes 210g on the array substrate 210b side and form pixel portions 210RPX, 210GPX, and 210BPX of three colors of R, G, and B together with each opposing pixel electrode 210g. Therefore, in the curved liquid crystal panel 210, a display pixel in which a color display of a predetermined tone can be made is configured by the pixel portions 210RPX, 210GPX, and 210BPX of three colors of R, G, and B adjacent to each other in the Y axis direction. The color filters 210Rk, 210Gk, and 210Bk of each color are respectively extended over substantially the entire length of the display region along the X axis direction, and are arranged to straddle (traverse) all of the pixel electrodes 210g lined along the X axis direction. That is, in the pixel portion 210RPX, 210GPX, and 210BPX of each color, the pixel portion of the same color is arranged by great numbers along the X axis direction. An inter-pixel light shielding portion 210*l* is arranged to divide the adjacent to each other color filters 210*k* in the Y axis direction, and partitions the pixel portions 210PX adjacent to each other in the Y axis direction and exhibiting different colors from each other. The inter-pixel light shielding portion 210*l* is extended over substantially the entire length of the display region along the X axis direction, and arranged to overlap the gate line 210*i* on the array substrate 210*b* side when seen in plan view.

Figure 14:
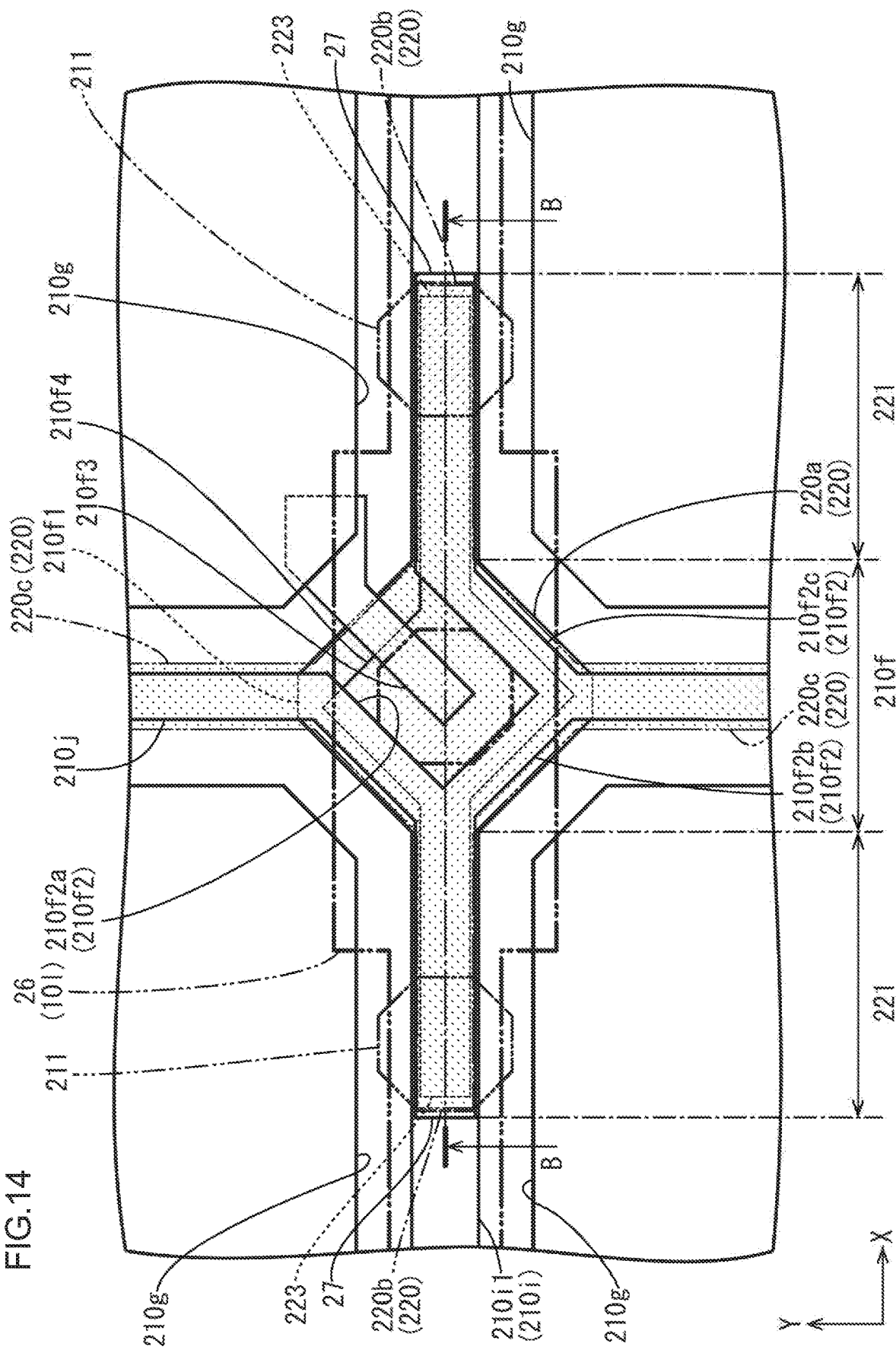
FIG. 14 is a plan view in which a vicinity of a TFT in a display region of an array substrate is enlarged.
Figure 15:
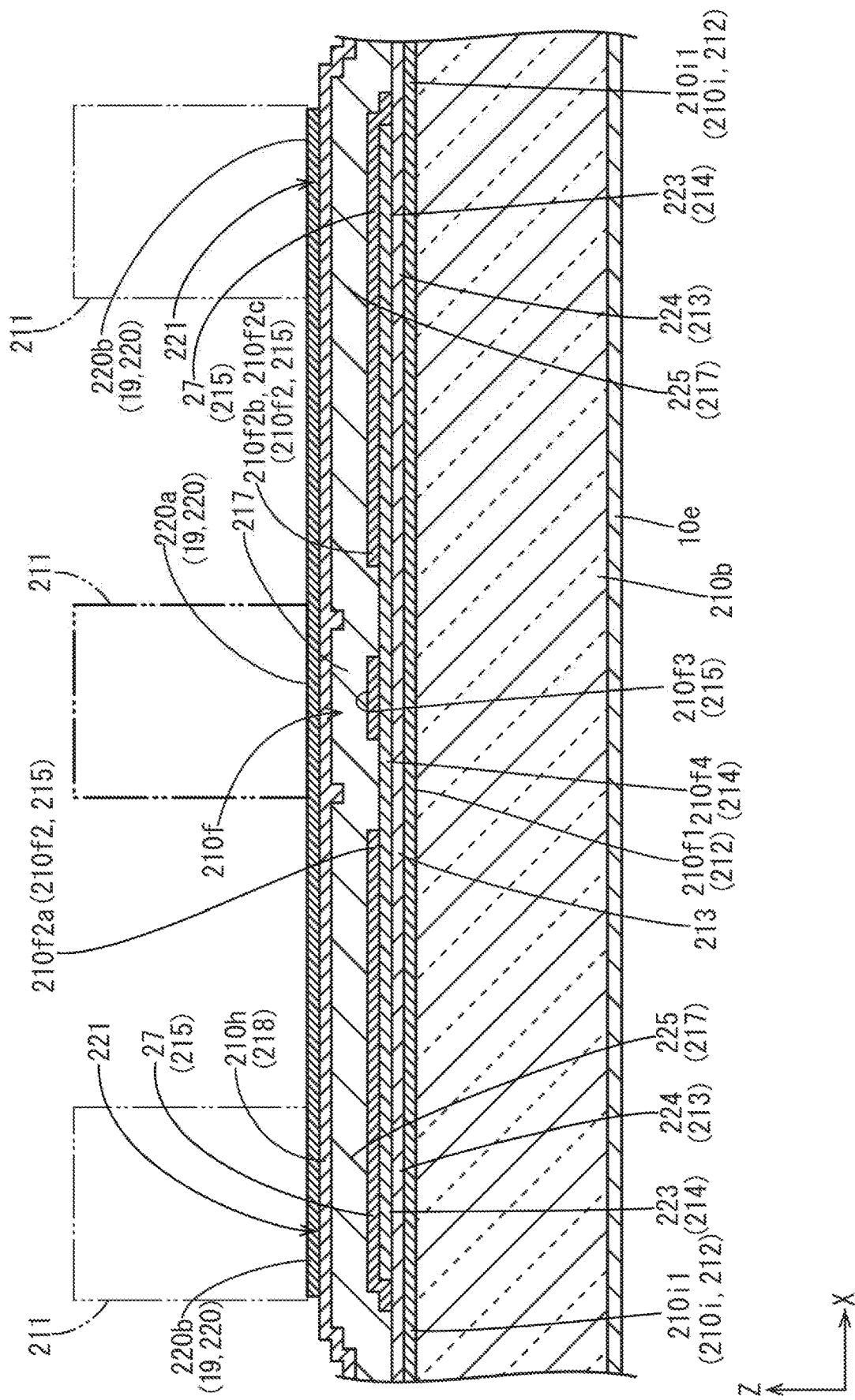
FIG. 15 is a cross-sectional view taken along line B-B in FIG. 14.

Next, the configuration of an extending portion 221 in the array substrate 210*b* will be described. As shown in FIGS. 14 and 15, the extending portion 221 is arranged to be adjacent to each other to the TFT 210*f* in the X axis direction (curved direction). The extending portion 221 is arranged in pairs so as to be adjacent to each other on one side (e.g., right side shown in FIG. 14) and the other side (e.g., left side shown in FIG. 14) in the X axis direction with respect to the TFT 210*f*. Therefore, in the array substrate 210*b*, one extending portion 221, the TFT 210*f* and the other extending portion 221 are sequentially arranged to form a column along the X axis direction, and such arrangement range is a range in which the flatness of the inner surface is guaranteed in the array substrate 210*b*. The arrangement range of the TFT 210*f* and the extending portions 221 becomes the fluctuation tolerable range of the contacting position of the spacer portion 211 with respect to the array substrate 210*b*. The TFT 210*f* and the extending portions 221 are substantially symmetric in plan view with respect to the X axis direction, and accompanying therewith, the pixel electrodes 210*g* are also substantially symmetric in plan view with respect to the X axis direction. In FIG. 14, the arrangement range of the TFT 210*f* and each extending portion 221 is illustrated with an arrow.

Specifically, as shown in FIGS. 14 and 15, the extending portion 221 at least includes a source electrode extending portion (electrode extending portion) 27 including a second metal film 215 (material) same as the source electrode 210*f*2, which is the configuring element of the TFT 210*f*, and being arranged to be adjacent to the source electrode 210*f*2 in the X axis direction and a channel extending portion 223 including a semiconductor film 214 (material) same as the channel portion 210*f*4 and being arranged to be adjacent to the channel portion 210*f*4 in the X axis direction. The source electrode extending portion 27 and the channel extending portion 223 overlap each other when seen in plan view, and also overlap a main body portion 210*i*1 of the gate line 210*i* (portion excluding the gate electrode 210*f*1) when seen in plan view. The source electrode extending portion 27 is directly continued with respect to the source electrode 210*f*2, where the width dimension (dimension in the Y axis direction) is substantially the same as the width dimension of the source electrode 210*f*2 and the source line 210*j* but is slightly smaller than the width dimension of the gate line 210*i*. More specifically, the source electrode extending portion 27 configuring the extending portion 221 on the right side shown in FIG. 14 is continued to an open end of the third source electrode configuring portion 210*f*2*c* configuring the source electrode 210*f*2, whereas the source electrode extending portion 27 configuring the extending portion 221 on the left side shown in FIG. 14 is continued to a joining portion of the first source electrode configuring portion 210*f*2*a* and the second source electrode configuring portion 210*f*2*b* configuring the source electrode 210*f*2. Similar to the source electrode extending portion 27, the channel extending portion 223 has a laterally long square shape directly continuing to the channel portion 210*f*4 and linearly extending along the X axis direction from the channel portion 210*f*4, where the width dimension is smaller than each width dimension of the gate line 210*i* and the source electrode extending portion 27. The channel extending portion 223 is arranged such that the entire region overlaps the source electrode extending portion 27. That is, the channel extending portion 223 is arranged such that the entire region overlaps the source electrode extending portion 27, and does not include a portion that does not overlap the source electrode extending portion 27, that is, a portion protruding to the outer side from the outer shape of the source electrode extending portion 27. Therefore, when the outside light is irradiated on the curved liquid crystal panel 210, such outside light is less likely to be irradiated on the channel extending portion 223, and hence the occurrence of display failure is suppressed similar to the first embodiment described above.

Furthermore, as shown in FIG. 15, the extending portion 221 includes, in addition to the source electrode extending portion 27 and the channel extending portion 223 described above, at least a main body portion 210*i*1 of the gate line 210*i* including the first metal film 212, a first insulating portion 224 including a gate insulating film 213 and interposed between the main body portion 210*i*1 of the gate line 210*i* and the channel extending portion 223, a second insulating portion 225 including an inter-layer insulating film 217 and interposed between the source electrode extending portion 27 and a common electrode 210*h*, and the common electrode 210*h* including the second transparent electrode film 218. Among these, the main body portion 210*i*1 of the gate line 210*i* includes the first metal film 212 same as the gate electrode 210*f*1, which is the configuring element of the TFT 210*f*, and is directly continued to the gate electrode 210*f*1, and hence is a structural object same as the gate electrode 210*f*1. Therefore, the extending portion 221 can be said as including substantially all the configuring elements omitting the drain electrode 210*f*3 of the TFT 210*f*, and the stacked structure is the same as the stacked structure of the TFT 210*f*. Thus, in the inner surface of the array substrate 210*b*, the flatness in a range extending along the X axis direction from the TFT 210*f* to the extending portion 221 is high.

As shown in FIGS. 14 and 15, the spacer portion 211 is arranged so as to overlap any one of the TFT 210*f* and the extending portions 221 adjacent to each other in the X axis direction (curved direction). According to such a configuration, even when the display surface 210DS is curved around the curved axis CAX from a flat state when manufacturing the curved liquid crystal panel 210, a situation where the spacer portion 211 makes contact on the array substrate 210*b* side at a position of not superimposing any one of the TFT 210*f* and the extending portions 221 is less likely to occur, and the reliability in which the spacer portion 211 makes contact on the array substrate 210*b* side at a position of superimposing one of the TFT 210*f* and the extending portions 221 becomes high. Thus, similar to the first embodiment, unevenness is less likely to occur in the image displayed in the display surface 210DS. Similar to the first embodiment described above, the spacer portions 211 dispersed within a plane of the display surface 210DS is brought into contact at the central position of the TFT 210*f* in the X axis direction in the array substrate 210b before the curved liquid crystal panel 210 is curved in the manufacturing process. In FIGS. 14 and 15, the spacer portion 211 arranged at a position closest to the curved axis CAX in the X axis direction is illustrated with a thick chain double dashed line, and the spacer portion 211 arranged at a position farthest from the curved axis CAX in the X axis direction, that is, at both end positions in the long side direction of the curved liquid crystal panel 210 is illustrated with a thin chain double dashed line.

As shown in FIGS. 14 and 15, the light shielding portion 220 is configured by an array side inter-electrode light shielding portion 220a arranged to straddle both the source electrode 210f2 and the drain electrode 210f3, an extended light shielding portion 220b obtained by expanding the array side inter-electrode light shielding portion 220a in the X axis direction, and a coupling light shielding portion 220c that couples the array side inter-electrode light shielding portions 220a adjacent to each other in the Y axis direction. In FIG. 14, the forming range of the light shielding portion 220 is illustrated in a hatched form. The array side inter-electrode light shielding portions 220a has a configuration similar to that described in the first embodiment described above. The coupling light shielding portion 220c arranged to overlap each extending portion 221 and the extended light shielding portion 220b are arranged in pairs so as to be adjacent to each other on one side (e.g., right side shown in FIG. 14) and the other side (e.g., left side shown in FIG. 14) with respect to the array side inter-electrode light shielding portion 220a. Therefore, in the array substrate 210b, one extended light shielding portion 220b, the array side inter-electrode light shielding portion 220a and the other extended light shielding portion 220b are sequentially lined to form a column along the X axis direction. The extended light shielding portions 220b are arranged to overlap each source electrode extending portion 27 and each channel extending portion 223, which are main parts of the extending portions 221, when seen in plan view. Thus, the flatness of the inner surface in the array substrate 210b is more suitably guaranteed, and the gap holding function by the spacer portion 211 is more suitably exhibited. Furthermore, the coupling light shielding portion 220c is provided to linearly extend along the Y axis direction from the array side inter-electrode light shielding portion 220a, and both ends are coupled to the adjacent array side inter-electrode light shielding portion 220a.

Fourth Embodiment

A fourth embodiment of the present invention will be described with reference to FIGS. 16 to 23. In the fourth embodiment, that in which the configuration of the curved liquid crystal panel 310, the arrangement of the extending portion 321, and the like are changed from the first embodiment described above is shown. Redundant description will be omitted on the structure, operation, and effect similar to the first embodiment described above.

Figure 16:
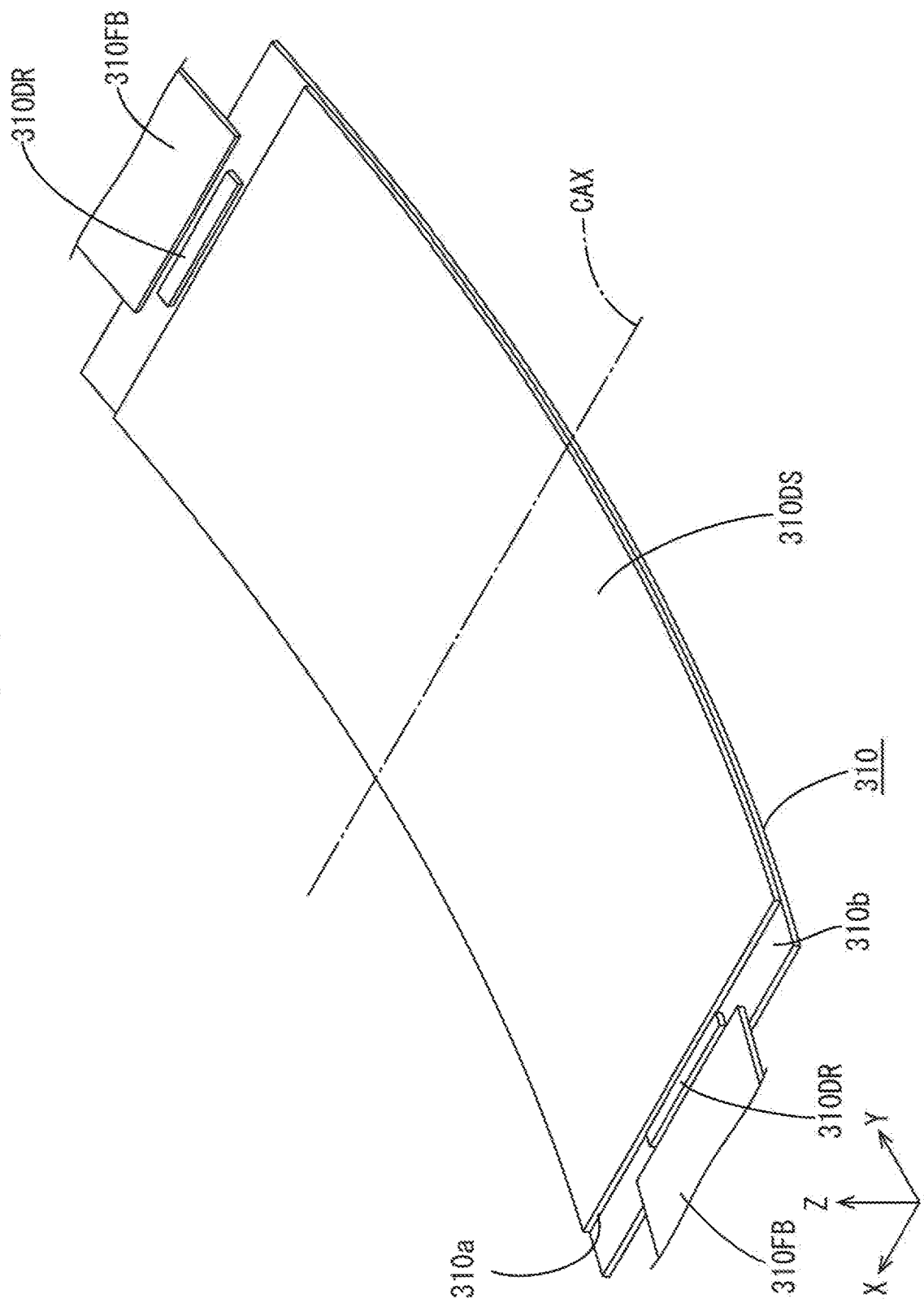
FIG. 16 is a schematic perspective view of a curved liquid crystal panel according to a fourth embodiment of the present invention.

As shown in FIG. 16, a curved liquid crystal panel 310 according to the present embodiment is curved to a substantially circular arc shape in which a central portion in the long side direction (Y axis direction) is retracted toward the back side and both ends in the long side direction bulge out toward the front side (inwardly warped shape). The curved axis CAX of the curved liquid crystal panel 310 according to the present embodiment is common with the first embodiment described above in that the axial direction coincides with the X axis direction, but is different from the first embodiment in that it is arranged on a CF substrate 310a side, which is a side opposite to an array substrate 310b side in the Z axis direction. That is, the CF substrate 310a is arranged closer to the curved axis CAX than the array substrate 310b in the Z axis direction.

Figure 17:
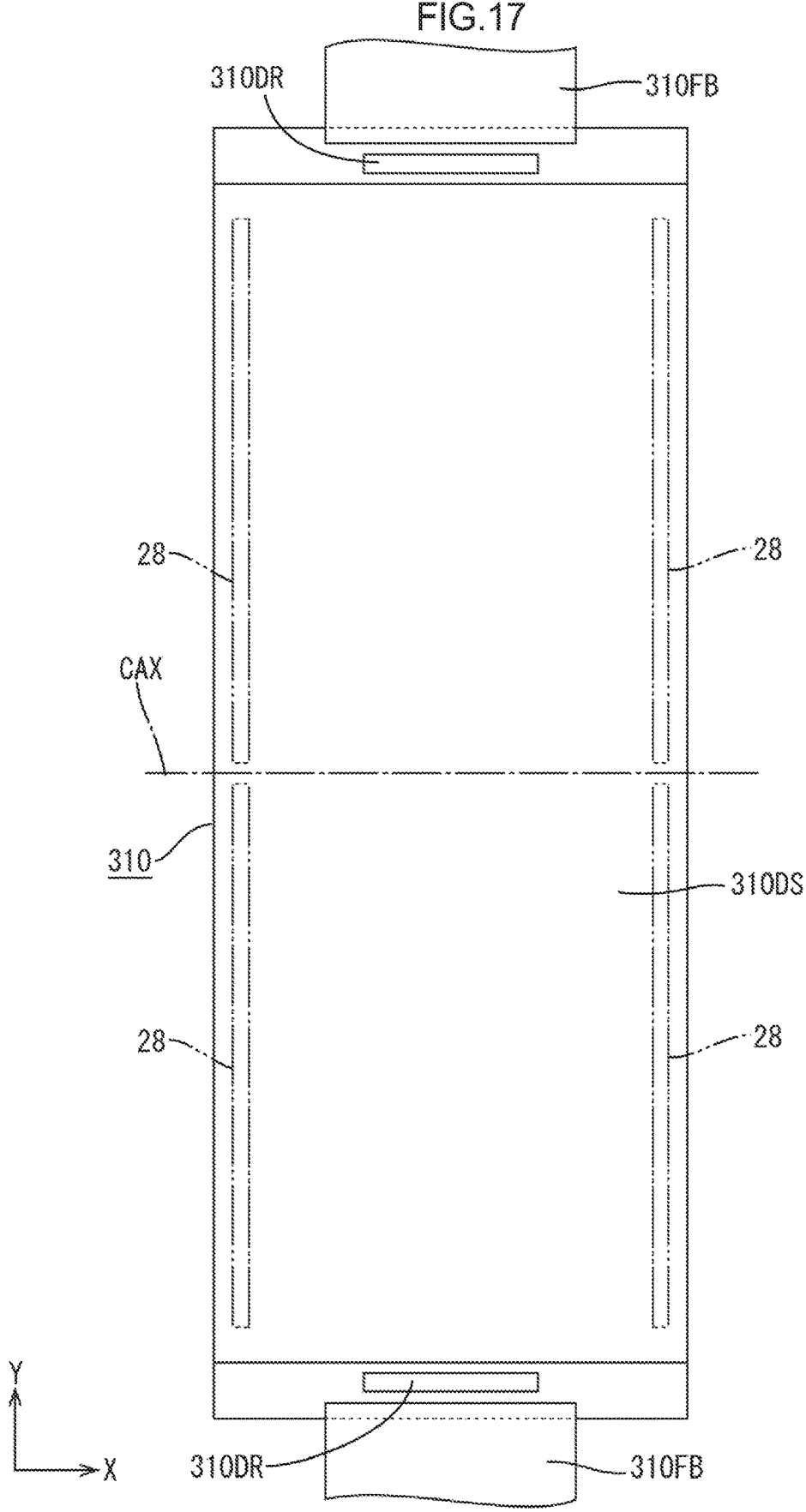
FIG. 17 is a plan view of the curved liquid crystal panel.

As shown in FIGS. 16 and 17, the driver 310DR and the flexible substrate 310FB are selectively connected so as to form a pair at both ends in the Y axis direction (curved direction) on the outer peripheral end of the curved liquid crystal panel 310. In the outer peripheral end of the curved liquid crystal panel 310, both ends in the X axis direction change their shape according to the position in the Y axis direction, whereas both ends in the Y axis direction have a constant shape and are flat regardless of the position in the X axis direction. That is, the driver 310DR and the flexible substrate 310FB are connected to the end where shape does not change in the direction along its side in the curved liquid crystal panel 310, and are avoided from being connected to the end where shape changes in the direction along its side. Thus, stress acting on the curved liquid crystal panel 310 with the curving of the curved liquid crystal panel 310 is less likely to be subjected to the influences of the driver 310DR and the flexible substrate 310FB, and is easily equalized in the Y axis direction. Therefore, to which side in the curved direction a spacer portion 311 is positionally misaligned with respect to the array substrate 310b with the curving of the curved liquid crystal panel 310 can be easily specified, and hence the reliability in which the spacer portion 311 is arranged to overlap an extending portion 321, to be described in detail later, with respect to the array substrate 310b becomes high.

As shown in FIG. 17, a GDM circuit unit 28 is monolithically provided on the array substrate 310b using a semiconductor film 314, and the like configuring a TFT 310f. The GDM circuit unit 28 is configured by a shift register including a plurality of stages to provide a scan signal such that a plurality of gate lines 310i are sequentially selected at every predetermined period. The GDM circuit unit 28 is provided in pairs so as to sandwich a display region from both sides in the X axis direction (extending direction of the gate line 310i). The GDM circuit unit 28 is extended along the Y axis direction (arranging direction of the gate line 310i) and provided in pairs so as to sandwich the curved axis CAX. The GDM circuit units 28 arranged on one side and the other side in the Y axis direction are respectively connected to drivers 310DR or flexible substrates 310FB arranged on one side and the other side in the Y axis direction, and receives the provision of a clock signal, and the like necessary for generating the scan signal.

Figure 18:
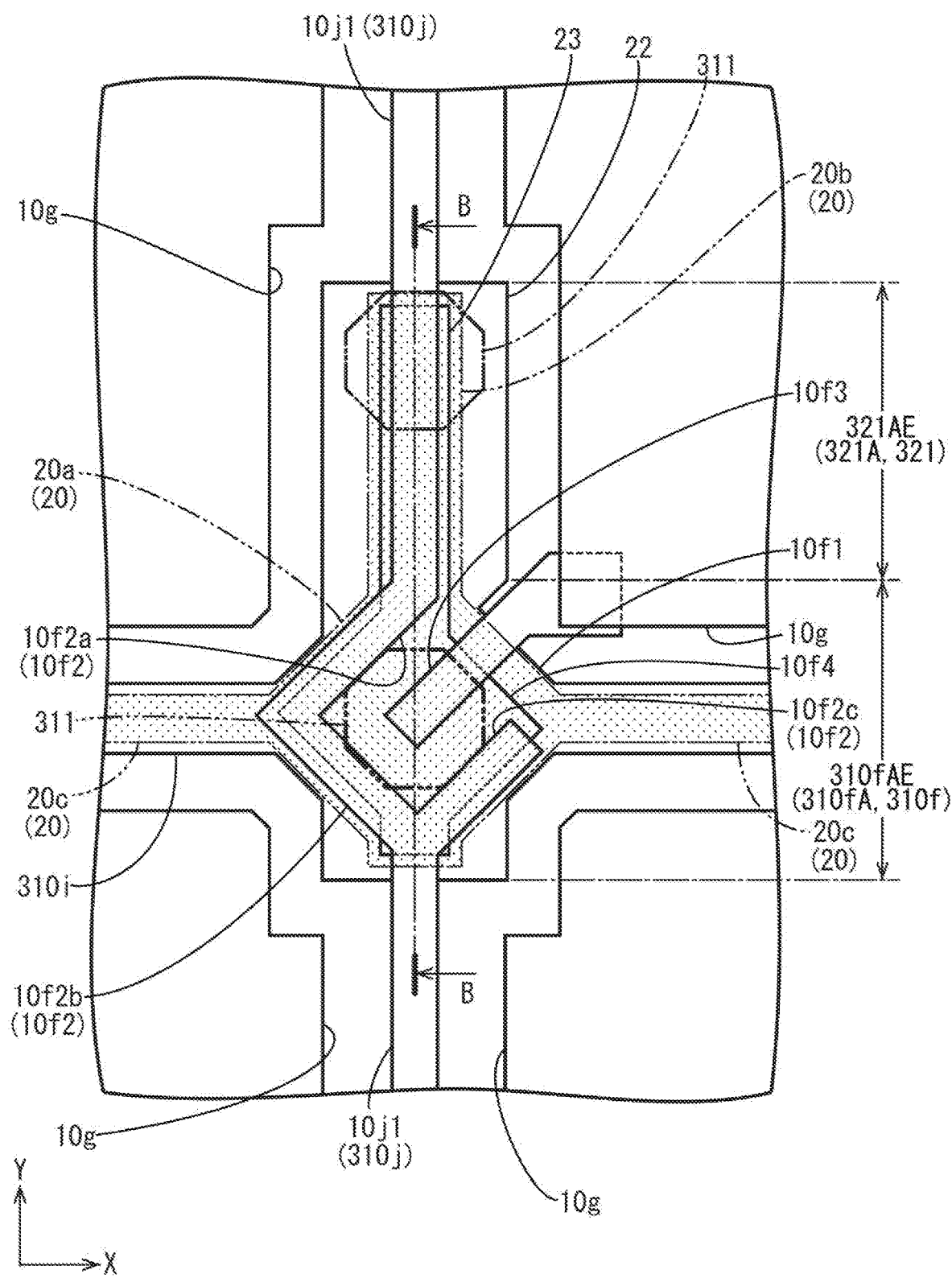
FIG. 18 is a plan view of a first end side TFT and a first end side extending portion.
Figure 19:
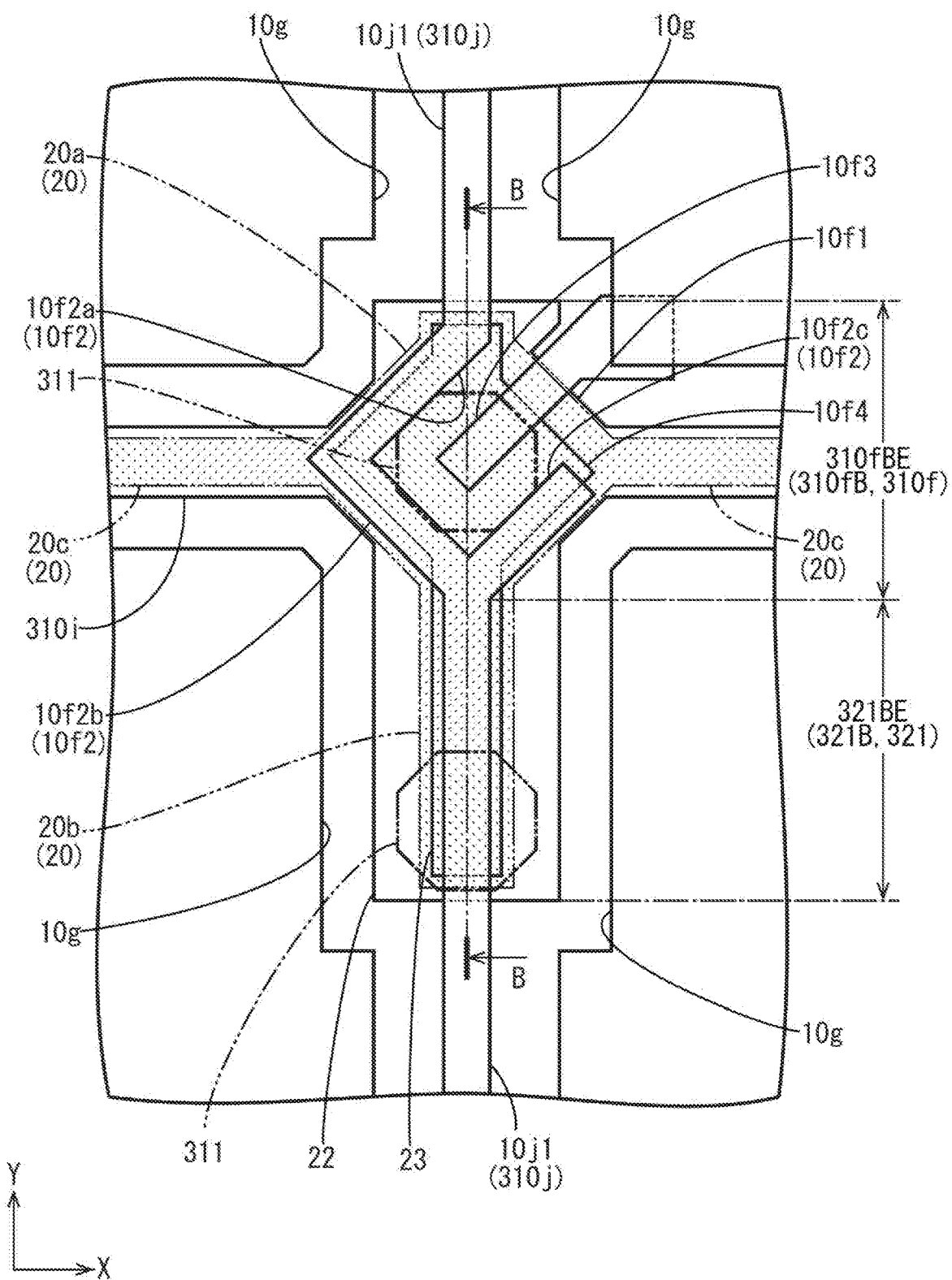
FIG. 19 is a plan view of a second end side TFT and a second end side extending portion.

As shown in FIGS. 18 and 19, an extending portion 321 provided on the array substrate 310b is selectively arranged so as to be adjacent to each other to only one side in the Y axis direction with respect to the TFT 310f. According to such a configuration, compared with a case in which extending portions 21 are arranged to be adjacent to each other on one side and the other side in the Y axis direction with respect to the TFT 10f (see FIG. 6) as in the first embodiment described above, the superimposing range of the extending portion 321 with respect to the source line (line) 310j becomes narrow or about a half. Thus, the signal blunt that may occur in the signal transmitted to the source line 310j is reduced. Which side, the one side or the other side, the extending portion 321 is arranged in the Y axis direction with respect to the TFT 310f is set according to the arrangement in the Y axis direction of the TFT 310f within a plane of the display surface 310DS shown in FIGS. 16 and 17. In other words, the extending portion 321 is arranged to be adjacent to each other on a side opposite to the curved axis CAX side in the Y axis direction with respect to the TFT 310*f*.

Figure 20:
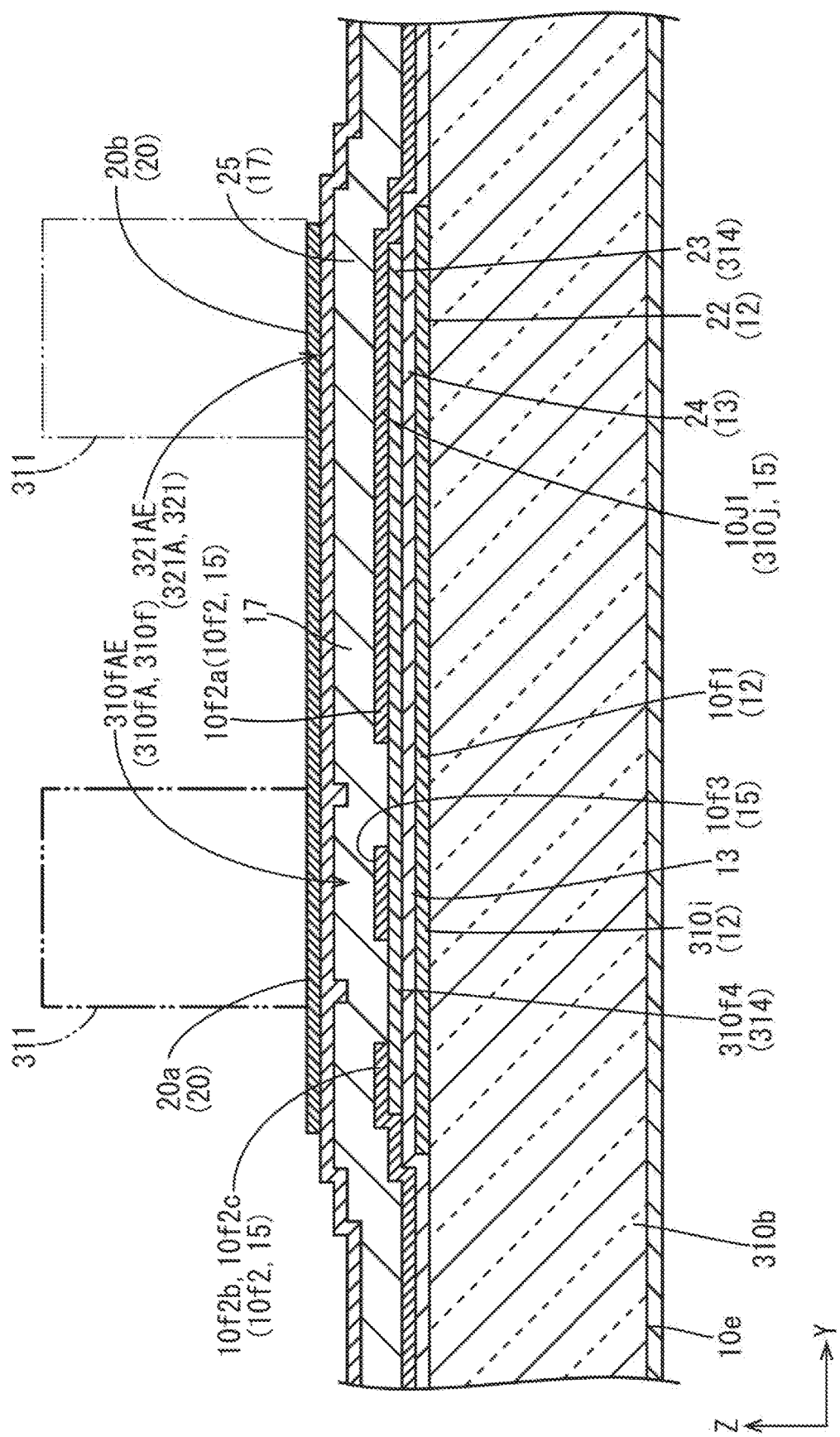
FIG. 20 is a cross-sectional view taken along line B-B of FIG. 18.
Figure 21:
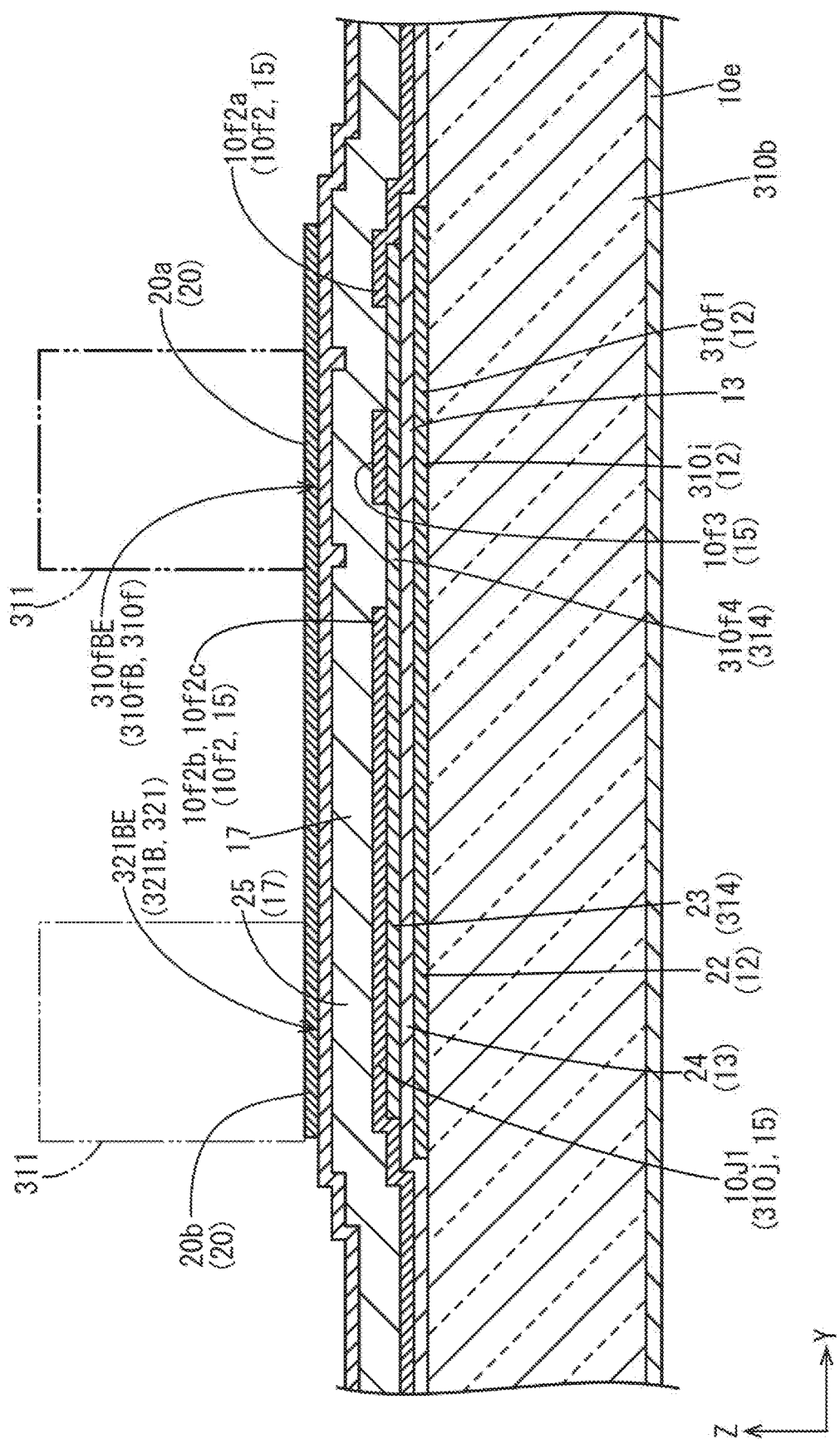
FIG. 21 is a cross-sectional view taken along line B-B of FIG. 19.
Figure 22:
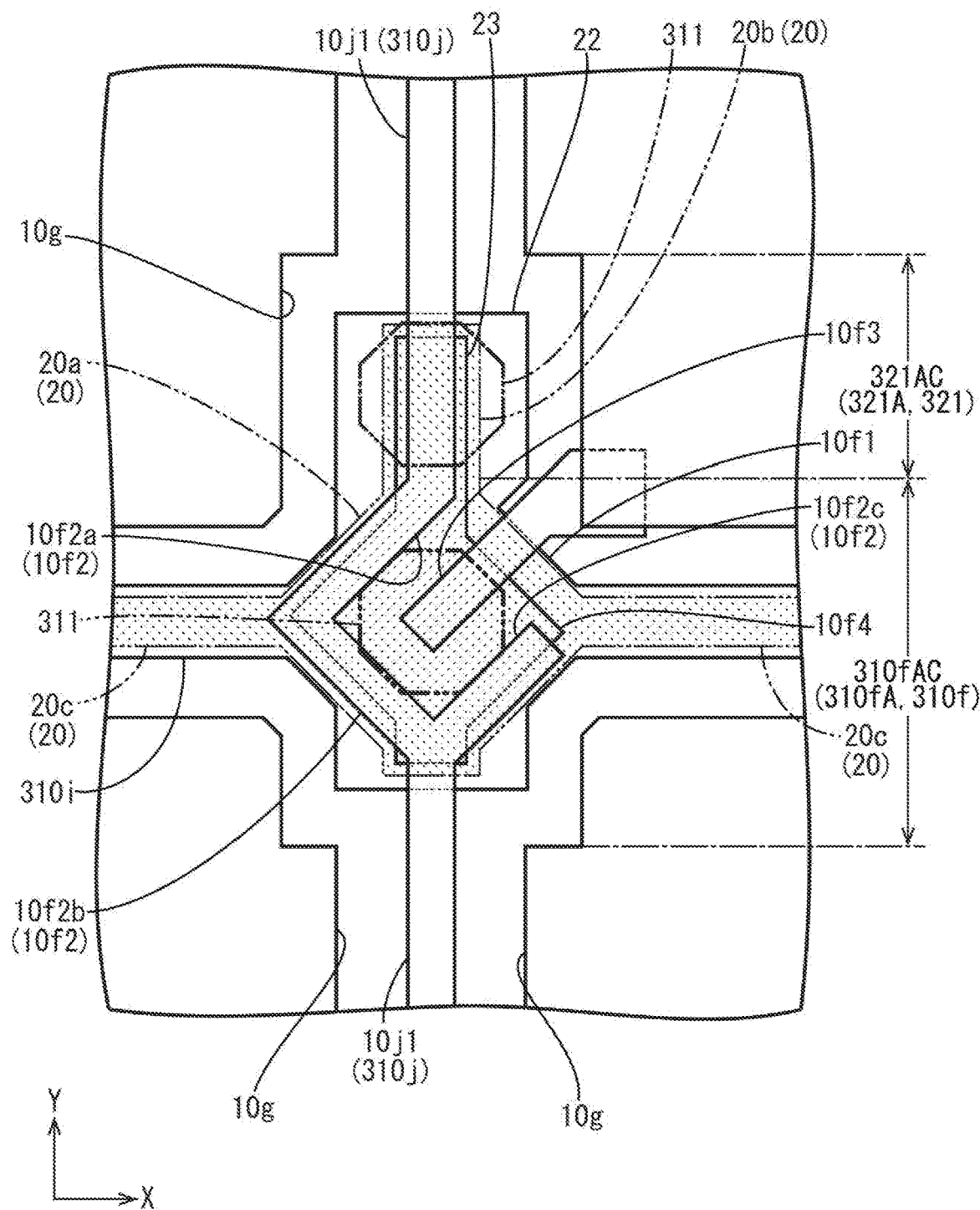
FIG. 22 is a plan view of a first central side TFT and a first central side extending portion.
Figure 23:
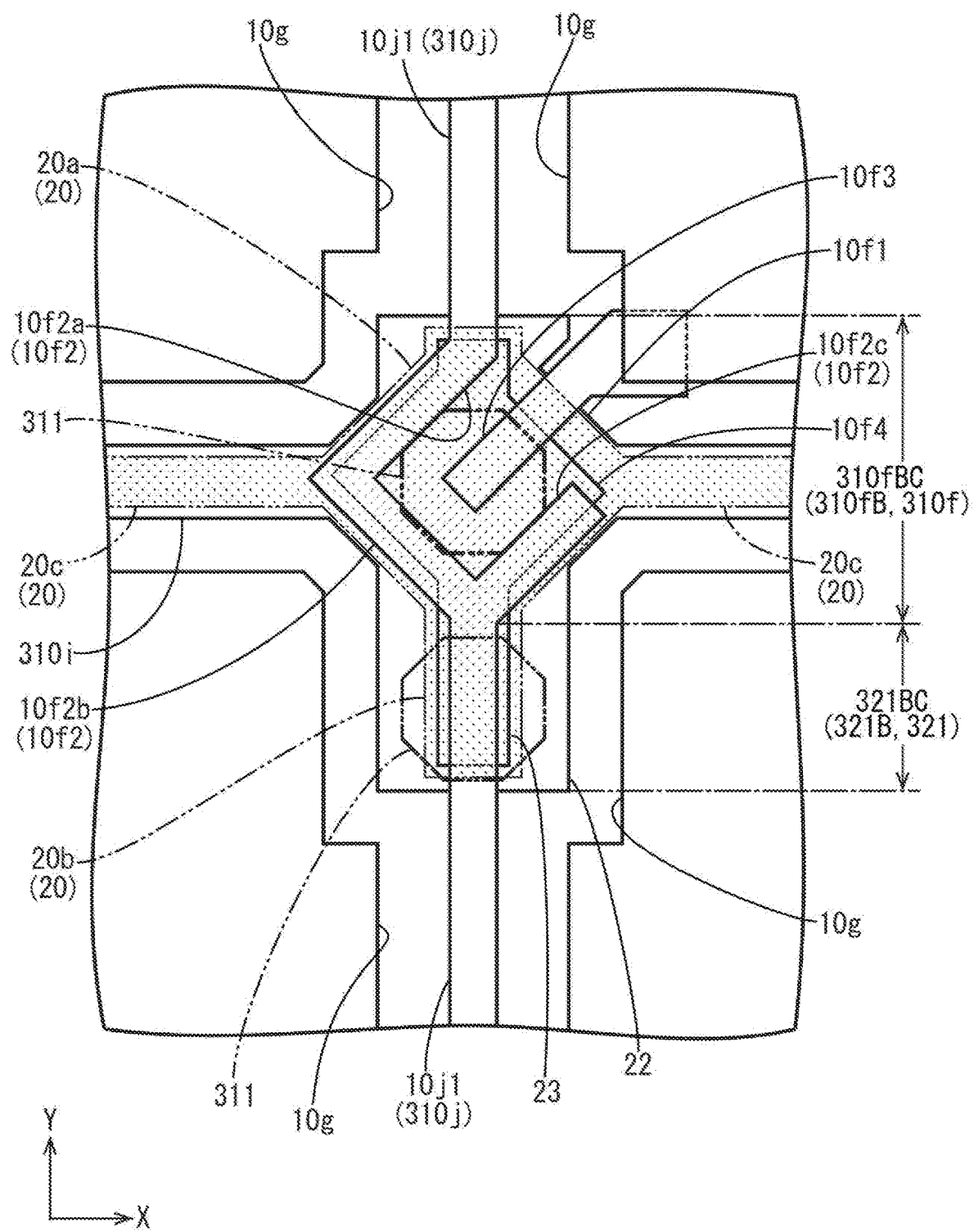
FIG. 23 is a plan view of a second central side TFT and a second central side extended portion.

Hereinafter, of the TFT 310*f* and the extending portion 321, that arranged on the upper side with respect to the curved axis CAX in FIGS. 16 and 17 is added with a suffix "A" to the reference numeral for the "first TFT and the first extending portion", that arranged on the lower side with respect to the curved axis CAX in FIGS. 16 and 17 is added with a suffix "B" to the reference numeral for the "second TFT and the second extending portion", and when collectively referring to the TFT 310*f* and the extending portion 321 without making distinctions, the suffix is not added to the reference numeral. FIGS. 18, 20 and 22 show the first TFT 310*f*A and the first extending portion 321A, and FIGS. 19, 21, and 23 show the second TFT 310*f*B and the second extending portion 321B. In FIGS. 18 and 22, the curved axis CAX (not shown) is arranged on the lower side in the figure (right side in FIG. 20) with respect to the first TFT 310*f*A and the first extending portion 321A, and in FIGS. 19 and 23, the curved axis CAX (not shown) is arranged on the upper side in the figure (left side in FIG. 21) with respect to the second TFT 310*f*B and the second extending portion 321B. Furthermore, in FIGS. 18 to 23, a spacer portion 311 arranged at a position closest to the curved axis CAX in the X axis direction is illustrated with a thick chain double dashed line, and a spacer portion 311 arranged at a position farthest from the curved axis CAX in the X axis direction, that is, at the end portion in the long side direction of the curved liquid crystal panel 310 is illustrated with a thin chain double dashed line.

Specifically, as shown in FIG. 18, the first extending portion 321A is selectively arranged so as to be adjacent to each other to only the upper side in FIG. 18 (left side in FIG. 20) on a side opposite to the curved axis CAX side in the Y axis direction with respect to the first TFT 310*f*A. As shown in FIG. 19, the second extending portion 321B is selectively arranged so as to be adjacent to each other to only the lower side in FIG. 19 (right side in FIG. 21) on a side opposite to the curved axis CAX side in the Y axis direction with respect to the second TFT 310*f*B. In a configuration in which the CF substrate 310*a* is arranged closer to the curved axis CAX than the array substrate 310*b* as in the present embodiment, the position of the spacer portion 311 with respect to the array substrate 310*b* tends to easily shift toward a side opposite to the curved axis CAX side in the Y axis direction with the curving of the curved liquid crystal panel 310. In regards to this, each extending portion 321A, 321B is arranged to be adjacent to each other to a side opposite to the curved axis CAX side in the Y axis direction with respect to each TFT 310*f*A, 310*f*B, and thus the reliability in which the positionally misaligned spacer portion 311 overlaps each extending portion 321A, 321B with respect to the array substrate 310*b* side becomes high. Specifically, as shown in FIG. 18, the spacer portion 311 arranged on the upper side shown in FIGS. 16 and 17 with respect to the curved axis CAX within a plane of the display surface 310DS tends to make contact with the array substrate 310*b* so as to be positionally misaligned to the upper side shown in FIG. 18 (left side shown in FIG. 20) on a side opposite to the curved axis CAX side in the Y axis direction with respect to the first TFT 310*f*A with the curving of the curved liquid crystal panel 310, and the reliability in which it overlaps the first extending portion 321A arranged thereat becomes high. On the other hand, as shown in FIG. 19, the spacer portion 311 arranged on the lower side shown in FIGS. 16 and 17 with respect to the curved axis CAX within a plane of the display surface 310DS tends to make contact with the array substrate 310*b* so as to be positionally misaligned to the lower side shown in FIG. 19 (right side shown in FIG. 21) on a side opposite to the curved axis CAX side in the Y axis direction with respect to the second TFT 310*f*B with the curving of the curved liquid crystal panel 310, and the reliability in which it overlaps the second extending portion 321B arranged thereat becomes high.

Furthermore, the extending portion 321 has the forming range in the Y axis direction set differently according to the arrangement in the Y axis direction within a plane of the display surface 310DS shown in FIGS. 16 and 17. In other words, as shown in FIGS. 18 to 23, the forming range in the Y axis direction in the extending portion 321 tends to be proportional to the distance from the curved axis CAX in the Y axis direction, and specifically, is set to change in a step-wise manner in two steps so that the forming range in the Y axis direction in the extending portion 321 farther from the curved axis CAX in the Y axis direction becomes relatively wide and the forming range in the Y axis direction in the extending portion 321 close to the curved axis CAX in the Y axis direction becomes relatively narrow. More specifically, the forming range in the Y axis direction in the extending portion 321 changes in two steps, where that arranged on the end side (end side farther from the curved axis CAX) in the Y axis direction is relatively narrow, and that arranged on the central side (side close to the curved axis CAX) in the Y axis direction is relatively narrow. Hereinafter, among the first TFT 310*f*A, the first extending portion 321A, the second TFT 310*f*B and the second extending portion 321B, those arranged on the end side (side farther from the curved axis CAX) in the Y axis direction within the plane of the display surface 310DS are given a suffix "E" to the respective reference numerals as "first end side TFT, first end side extending portion, second end side TFT and second end side extending portion", and those arranged on the central side (side close to the curved axis CAX) in the Y axis direction within the plane of the display surface 310DS are given a suffix "C" to the respective reference numerals as "first central side TFT, first central side extending portion, second central side TFT and second central side extending portion".

Specifically, as shown in FIGS. 18 and 19, the first end side extending portion 321AE and the second end side extending portion 321BE are the same as the first end side TFT 310*f*AE and the second end side TFT 310*f*BE, which forming ranges in the Y axis direction are adjacent to each other. On the other hand, as shown in FIGS. 22 and 23, the first central side extending portion 321AC and the second central side extending portion 321BC are narrower than the first central side TFT 310*f*AC and the second central side TFT 310*f*BC and the first end side extending portion 321AE and the second end side extending portion 321BE described above, which forming ranges in the Y axis direction are adjacent to each other, and specifically, is about half of the first end side extending portion 321AE and the second end side extending portion 321BE. The forming range in the Y axis direction in each TFT 310*f*AC, 310*f*AE, 310*f*BC, and 310*f*BE is the same with respect to each other.

The positional misalignment amount in the Y axis direction of the spacer portion 311 with respect to the array substrate 310*b* involved in the curving of the curved liquid crystal panel 310 may vary according to the arrangement in the Y axis direction of the spacer portion 311 within a plane of the display surface 310DS, and specifically, the positional misalignment amount in the Y axis direction of the spacer portion 311 arranged on the end side (end side farther from the curved axis CAX) in the Y axis direction tends to be relatively large, and the positional misalignment amount in the Y axis direction of the spacer portion 311 arranged on the central side (side close to the curved axis CAX) in the Y axis direction tends to be relatively small. With regards to this point, for the first end side extending portion 321AE and the second end side extending portion 321BE, as shown in FIGS. 18 and 19, the forming range in the Y axis direction is made relatively wide so that even when the positional misalignment amount in the Y axis direction of the spacer portion 311 with respect to the array substrate 310b involved in the curving of the curved liquid crystal panel 310 becomes large, such positional misalignment can be sufficiently absorbed. On the other hand, for the first central side extending portion 321AC and the second central side extending portion 321BC, as shown in FIGS. 22 and 23, even when the forming range in the Y axis direction is made relatively narrow, the positional misalignment amount in the Y axis direction of the spacer portion 311 with respect to the array substrate 310b involved in the curving of the curved liquid crystal panel 310 is essentially small, and hence such positional misalignment can be sufficiently absorbed. As the forming range in the Y axis direction in the first central side extending portion 321AC and the second central side extending portion 321BC is made narrow, an occupied area of the extending portion 321 in the array substrate 310b can be made narrow, and hence the problems that may arise with the installation of the extending portion 321 can be reduced. Specifically, for example, the overlapping area of the first central side extending portion 321AC and the second central side extending portion 321BC with respect to the source line 310j becomes smaller than the overlapping area of the first end side extending portion 321AE and the second end side extending portion 321BE, and hence the signal blunt that may occur in the image signal transmitted to the source line 310j is reduced.

As described above, according to the present embodiment, the array substrate 310b is provided with at least the source line (line) 310j extended along the curved direction and connected to the TFT 310f, and arranged to at least partially overlap the extending portion 321, and the extending portion 321 is selectively arranged to be adjacent to each other to only one side in the curved direction with respect to the TFT 310f. Accordingly, compared to a case in which the extending portion is arranged to be adjacent to each other on one side and the other side in the curved direction with respect to the TFT 310f, the superimposing range of the extending portion 321 with respect to the source line 310j becomes narrow. Thus, the signal blunt that may occur in the signal transmitted to the source line 310j is reduced.

Furthermore, when the CF substrate 310a is arranged close to the curved axis CAX than the array substrate 310b, the extending portion 321 is arranged to be adjacent to each other on the side opposite to the curved axis CAX side in the curved direction with respect to the TFT 310f. Thus, first when the CF substrate 310a is arranged closer to the curved axis CAX than the array substrate 310b, the position of the spacer portion 311 with respect to the array substrate 310b tends to easily shift to the side opposite to the curved axis CAX side in the curved direction with the curving of the curved liquid crystal panel 310. In this case, the extending portion 321 is arranged adjacent to each other to the side opposite to the curved axis CAX side in the curved direction with respect to the TFT 310f, and hence the reliability in which the positionally misaligned spacer portion 311 is arranged to overlap the extending portion 321 with respect to the array substrate 310b side becomes high.

Furthermore, the TFT 310f, the extending portion 321, and the spacer portion 311 are arranged in plurals at intervals in at least the curved direction, where in the extending portions 321, the forming range in the curved direction is narrower for those arranged close to the curved axis CAX in the curved direction than those arranged farther from the curved axis CAX in the curved direction. In the spacer portions 311 arranged at intervals in the curved direction, those arranged close to the curved axis CAX in the curved direction tend to have smaller positional misalignment amount with respect to the array substrate 310b when the curved liquid crystal panel 310 is curved around the curved axis CAX compared with those arranged farther from the curved axis CAX in the curved direction. On the other hand, in the extending portions 321 arranged at intervals in the curved direction, those arranged close to the curved axis CAX in the curved direction have narrower forming range in the curved direction than those arranged farther from the curved axis CAX in the curved direction, and thus the reliability in which the spacer portion 311 is located in a region superimposing the extending portion 321 in the array substrate 310b is sufficiently ensured, and it is suitable for making the occupying region of the extending portion 321 in the array substrate 310b narrow.

Moreover, at least flexible substrates (signal transmitting member) 310FB for transmitting a signal for driving at least the TFT 310f are respectively selectively connected to both ends in the curved direction in the outer peripheral end of the array substrate 310b. The TFT 310f is thus driven based on the signal transmitted by the flexible substrate 310FB. Since the flexible substrates 310FB are selectively connected to both ends in the curved direction in the outer peripheral end of the array substrate 310b, respectively, the flexible substrate 310FB is avoided from being connected to the end in the axial direction of the curved axis CAX in the outer peripheral end of the array substrate 310b, and the stress acting on the curved liquid crystal panel 310 with the curving of the curved liquid crystal panel 310 is easily equalized in the curved direction. Thus, on which side in the curved direction the spacer portion 311 is positionally misaligned with respect to the array substrate 310b with the curving of the curved liquid crystal panel 310 is easily specified, whereby the reliability in which the spacer portion 311 is arranged to overlap the extending portion 321 with respect to the array substrate 310b becomes high.

Other Embodiments

The present invention is not limited to the embodiments described above with reference to the drawings, and for example, the following embodiments are also encompassed within the technical scope of the present invention.

(1) In each embodiment described above, the curved liquid crystal panel curved around the axis of curvature has been shown, but a curved liquid crystal panel respectively curved around a plurality of curves axes may be adopted. In this case, a design in which the curved axes are arranged parallel to each other and spaced apart in the curved direction may be adopted, and a design in which the curved axes intersect each other may be adopted. When the design in which the curved axes intersect each other is adopted, the TFT and the extending portion are arranged along the curved direction so that the displacement amount of the spacer portion involved in the curving of the curved liquid crystal panel becomes a maximum, and the spacer portion is preferably arranged to overlap at least one of the TFT and the extending portion.

(2) The curved liquid crystal panel described in the first to third embodiments described above may be curved to an inwardly warped shape as in the fourth embodiment. In this case, the CF substrate configuring the curved liquid crystal panel is arranged close to the curved axis than the array substrate.

(3) The curved liquid crystal panel described in the fourth embodiment described above may be curved to an outwardly warped shape as in the first to third embodiments. In this case, the CF substrate configuring the curved liquid crystal panel is arranged farther from the curved axis than the array substrate, and hence a configuration in which the extending portion is arranged to be adjacent to each other on the curved axis side in the curved direction with respect to the TFT is preferably adopted.

(4) In each embodiment described above, a configuration in which the spacer portion arranged at a position closest to the curved axis in the curved direction is brought into contact with the central position of the TFT has been shown, but a configuration in which the spacer portion arranged at a position closest to the curved axis in the curved direction is brought into contact at a different position in the curved direction with respect to the central position of the TFT may be adopted.

(5) In the second embodiment described above, a case in which the gate electrode extending portion and the channel extending portion are respectively separated from the gate electrode and the channel portion of the TFT has been shown, but for example, the gate electrode extending portion may be separated from the gate electrode but the channel extending portion may be continued to the channel portion. Operations and effects similar to the second embodiment are obtained even with such a configuration.

(6) In the second embodiment described above, a case in which the gap provided between the TFT and the extending portion is smaller than the radial dimension of the spacer portion has been described, but the gap provided between the TFT and the extending portion may be the same as or larger than the radial dimension of the spacer portion.

(7) In the fourth embodiment described above, a case in which the forming range in the curved direction in the extending portion changes in a step-wise manner of two steps according to the distance from the curved axis has been described, but it may change in a step-wise manner of three or more steps. Furthermore, a configuration in which the forming range in the curved direction in the extending portion continuously and gradually changes according to the distance from the curved axis may be adopted.

(8) The second and third embodiments described above may be combined, and the extending portion may be separated from the TFT in the curved liquid crystal panel having a configuration in which the axial direction of the curved axis coincides with the extending direction of the source line and the curved direction coincides with the extending direction of the gate line.

(9) The second and fourth embodiments described above may be combined, and the extending portion selectively arranged to be adjacent to each other to only one side in the curved direction with respect to the TFT may be separated from the TFT.

(10) The third and fourth embodiments described above may be combined, and the extending portion may be selectively arranged to be adjacent to each other to only one side in the curved direction with respect to the TFT in the curved liquid crystal panel having a configuration in which the axial direction of the curved axis coincides with the extending direction of the source line and the curved direction coincides with the extending direction of the gate line.

(11) Other than the embodiments described above, the channel portion in the TFT and a specific forming range of a semiconductor material continuing to the channel portion may be appropriately changed. For example, the semiconductor material continuing to the channel portion may be formed in a range wider than the forming range of the source electrode.

(12) In each embodiment described above, a case in which the light shielding portion including the third metal film is arranged on the upper layer side of the common electrode and arranged to directly make contact with the common electrode has been described, but the light shielding portion may be arranged on the lower layer side of the common electrode and arranged to directly make contact with the common electrode. Furthermore, the light shielding portion may be provided on a layer that does not directly make contact with the common electrode. For example, an insulating film may be formed between the light shielding portion and the common electrode, and furthermore, a contact hole for connecting the light shielding portion and the common electrode may be formed in the insulating film.

(13) In each embodiment described above, a case in which the light shielding portion includes the third metal film has been described, but the light shielding portion may be configured by a light shielding material other than the metal material.

(14) In each embodiment described above, the light shielding portion and the third metal film provided on the array substrate side may be omitted. In this case, the forming range of the CF side inter-electrode light shielding portion provided on the CF substrate side is extended, so that it can be replaced to the array side inter-electrode light shielding portion and the extended light shielding portion.

(15) In each embodiment described above, a case in which the driver is COG (Chip On Glass) mounted directly on the array substrate configuring the curved liquid crystal panel has been described, but a flexible substrate on which the driver is COF (Chip On Film) mounted may be connected to the array substrate.

(16) Other than each embodiment described above, the specific mounting number of the driver and the flexible substrate with respect to the array substrate may be appropriately changed.

(17) In each embodiment described above, a case in which the planar shape of the curved liquid crystal panel is a rectangle has been described, but the planar shape of the curved liquid crystal panel may be other than a rectangle such as square, circle, semi-circle, ellipse, semi-ellipse, trapezoid, and the like.

(18) In each embodiment described above, a case in which the operation mode of the curved liquid crystal panel is the FFS mode has been described, but TN (Twisted Nematic) mode in which the liquid crystals having a positive dielectric anisotropy are oriented in a state twisted by substantially 90° when seen from a substrate normal direction, a vertical alignment (VA) mode in which the liquid crystals having a negative dielectric anisotropy are oriented such that a major axis of the liquid crystal molecules are vertical to a substrate surface and the like may be implemented.

EXPLANATION OF SYMBOLS 10, 210, 310: liquid crystal panel (curved display panel)
10DS, 210DS, 310DS: display surface
10a, 210a, 310a: CF substrate (second substrate)

10b, 110b, 210b, 310b: array substrate (first substrate)
10f, 110f, 210f, 310f: TFT (switching component)
10f1, 110f1, 210f1: gate electrode
10f2, 110f2, 210f2, 310f2: source electrode
10f3, 210f3, 310f3: drain electrode
10f4, 110f4, 210f4: channel portion
10g, 210g: pixel electrode
10h, 210h: common electrode
10i, 110i, 310i: gate line (first line)
10j, 110j, 310j: source line (second line, line)
10k, 210k: color filter
10FB, 210FB, 310FB: flexible substrate (signal transmitting member)
11, 111, 211, 311: spacer portion
13, 213: gate insulating film (insulating film)
17, 217: inter-layer insulating film (insulating film)
20a, 220a: array side inter-electrode light shielding portion (inter-electrode light shielding portion)
20b, 220b: extended light shielding portion
20c, 220c: coupling light shielding portion
21, 121, 221, 321: extending portion
22, 122: gate electrode extending portion (electrode extending portion)
23, 123, 223: channel extending portion
27: source electrode extending portion (electrode extending portion)
CAX: axis of curvature (first axis of curvature)
210i: gate line (second line, line)
210j: source line (first line)

The invention claimed is:

1. A curved display panel including a display surface on which an image is displayed is curved about at least one axis of curvature, the curved display panel comprising:
   first and second substrates including plate surfaces disposed to face each other with a gap therebetween;
   at least one switching component included in the first substrate, the at least one switching component including at least a source electrode and a drain electrode, the at least one switching component being configured to control a current between the source electrode and the drain electrode;
   extending portions extending from elements of the at least one switching component except for at least the drain electrode in the first substrate, the extending portions including an electrode extending portion extending from the source electrode, the extending portions being disposed outside an arrangement area in which the at least one switching component is disposed, the extending portions extending from the at least one switching component in a curved direction perpendicular to the axis of curvature and along the display surface; and
   at least one spacer portion disposed on the second substrate and being in contact with the first substrate to hold the gap between the first and the second substrates, the at least one spacer portion overlapping at least the at least one switching component or one of the extending portions adjacent to the at least one switching component.

2. The curved display panel according to claim 1, wherein
   the at least one switching component includes at least a channel portion formed of a semiconductor material and connected to the source electrode and the drain electrode, and
   the first substrate includes at least one inter-electrode light shielding portion arranged to straddle at least the source electrode and the drain electrode.

3. The curved display panel according to claim 2, wherein an extended light shielding portion obtained by expanding the at least one inter-electrode light shielding portion and arranged to overlap at least a section of the extending portion is provided on the first substrate.

4. The curved display panel according to claim 2, wherein
   the at least one switching component and the at least one inter-electrode light shielding portion include switching components and inter-electrode light shielding portions, respectively, which are arranged at intervals in at least one of an axial direction of the at least one axis of curvature and the curved direction,
   the first substrate includes at least:
      a pixel electrode connected to the drain electrode;
      a common electrode disposed to overlap the pixel electrode via an insulating film and supplied with a reference potential; and
      a coupling light shielding portion that couples the inter-electrode light shielding portions arranged at intervals in at least the axial direction of the at least one axis of curvature or the curved direction, and
   the inter-electrode light shielding portions and the coupling light shielding portion are formed of a material having light shielding property and conductivity, and
   the inter-electrode light shielding portions and the coupling light shielding portion are arranged to contact the common electrode.

5. The curved display panel according to claim 1, wherein the at least one switching component including at least two sets of the extending portions and the at least two sets of the extending portions extend from a first end and a second end of the at least one switching component, respectively, in the curved direction and extend in opposite directions.

6. The curved display panel according to claim 1, wherein
   the first substrate includes a line extending along the curved direction to be connected to the switching component and arranged to at least partially overlap the extending portion is at least provided on the first substrate, and
   none of the extending portions is disposed adjacent to one of a first end and a second end of the switching component in the curved direction.

7. The curved display panel according to claim 6, wherein the extending portion is arranged to be adjacent to each other on a side opposite to the at least one axis of curvature side in the curved direction with respect to the switching component when the second substrate is arranged closer to the at least one axis of curvature than the first substrate, and is arranged to be adjacent to each other on the at least one axis of curvature side in the curved direction with respect to the switching component when the second substrate is arranged farther from the at least one axis of curvature than the first substrate.

8. The curved display panel according to claim 6, wherein
   the at least one switching component includes switching components and the at least one spacer portion includes spacer portions so that switching components, the extending portions, and the spacer portions are at intervals at least in the curved direction, and
   the extending portions closer to the at least one axis of curvature in the curved direction have smaller area, the extending portion arranged closer to the at least one axis of curvature in the curved direction has a narrower forming range in the curved direction than the extending portion arranged farther from the at least one axis of curvature in the curved direction.

9. The curved display panel according to claim 6, wherein at least two signal transmitting members that transmit a signal for driving at least the switching component are selectively connected to both ends in the curved direction of an outer peripheral end of the first substrate.

10. The curved display panel according to claim 1, wherein
a first line extending along the at least one axis of curvature and connected to the switching component, and a second line extending along the curved direction and connected to the switching component, and being arranged to at least partially overlap the extending portion are at least provided on the first substrate and
the extending portion is arranged separated from the switching component at a position with a gap in the curved direction with respect to the switching component.

11. The curved display panel according to claim 1, wherein
the extending portions are adjacent to a first end and a second end of the switching component in the curved direction,
the at least one spacer portion includes spacer portions dispersed within a plane of the display surface, and
one of the spacer portions at a position the closest to the at least one axis of curvature in the curved direction is located at a center of the switching component in the first substrate.

12. The curved display panel according to claim 1, wherein the drain electrode includes no extending portion extending from the drain electrode.

13. A curved display panel including a display surface on which an image is displayed is curved about at least one axis of curvature, the curved display panel comprising:
first and second substrates including plate surfaces disposed to face each other with a gap therebetween;
at least one switching component included in the first substrate, the at least one switching component including at least a source electrode and a drain electrode, the at least one switching component being configured to control a current between the source electrode and the drain electrode;
extending portions extending from elements of the at least one switching component except for at least the drain electrode in the first substrate, the extending portions being disposed outside an arrangement area in which the at least one switching component is disposed, the extending portions being adjacent to the at least one switching component in a curved direction perpendicular to the axis of curvature and along the display surface; and
at least one spacer portion disposed on the second substrate to hold the gap between the first and the second substrates, the at least one spacer portion overlapping at least the at least one switching component or one of the extending portions adjacent to the at least one switching component, wherein
the first substrate includes a first line extending along the at least one axis of curvature and a second line extending along the curved direction,
the at least one switching component includes at least a gate electrode and a channel portion, the gate electrode being connected to the first line or the second line, the channel portion being formed of a semiconductor material and disposed to overlap the gate electrode via an insulating film to be connected to the source electrode and the drain electrode, the source electrode being connected to the second line or the first line, and
the extending portion includes at least an electrode extending portion and a channel extending portion, the electrode extending portion being formed of a material same as the gate electrode or the source electrode connected to the first line and arranged adjacent to the gate electrode or the source electrode in the curved direction to overlap a section of the second line, the channel extending portion being formed of a material same as the channel portion and arranged adjacent to the channel portion in the curved direction and to overlap a section of the second line and the electrode extending portion.

14. The curved display panel according to claim 13, wherein the channel extending portion is coupled to the channel portion so that an entire area of the channel extending portion overlaps the electrode extending portion.

15. A curved display panel including a display surface on which an image is displayed is curved about at least one axis of curvature, the curved display panel comprising:
first and second substrates including plate surfaces disposed to face each other with a gap therebetween;
at least one switching component included in the first substrate, the at least one switching component including at least a source electrode and a drain electrode, the at least one switching component being configured to control a current between the source electrode and the drain electrode;
extending portions extending from elements of the at least one switching component except for at least the drain electrode in the first substrate, the extending portions being disposed outside an arrangement area in which the at least one switching component is disposed, the extending portions being adjacent to the at least one switching component in a curved direction perpendicular to the axis of curvature and along the display surface; and
at least one spacer portion disposed on the second substrate to hold the gap between the first and the second substrates, the at least one spacer portion overlapping at least the at least one switching component or one of the extending portions adjacent to the at least one switching component, wherein
a pixel electrode connected to the drain electrode is provided in plurals along an axial direction of the at least one axis of curvature and the curved direction on the first substrate and
a plurality of color filters exhibiting different colors from each other are provided along the axial direction of the at least one axis of curvature on the second substrate to overlap the plurality of pixel electrodes, the plurality of color filters extending along the curved direction and being arranged to straddle the plurality of pixel electrodes lined along the curved direction.

16. The curved display panel according to claim 15, wherein
the at least one switching component includes at least a channel portion formed of a semiconductor material and connected to the source electrode and the drain electrode, and
the first substrate includes at least one inter-electrode light shielding portion arranged to straddle at least the source electrode and the drain electrode.

17. The curved display panel according to claim 16, wherein an extended light shielding portion obtained by expanding the at least one inter-electrode light shielding portion and arranged to overlap at least a section of the extending portion is provided on the first substrate.

18. The curved display panel according to claim 16, wherein the at least one switching component and the at least one inter-electrode light shielding portion include switching components and inter-electrode light shielding portions, respectively, which are arranged at intervals in at least one of an axial direction of the at least one axis of curvature and the curved direction, the first substrate includes at least:
- a pixel electrode connected to the drain electrode;
- a common electrode disposed to overlap the pixel electrode via an insulating film and supplied with a reference potential; and
- a coupling light shielding portion that couples the inter-electrode light shielding portions arranged at intervals in at least the axial direction of the at least one axis of curvature or the curved direction, and the inter-electrode light shielding portions and the coupling light shielding portion are formed of a material having light shielding property and conductivity, and the inter-electrode light shielding portions and the coupling light shielding portion are arranged to contact the common electrode.

19. The curved display panel according to claim 15, wherein the extending portions are adjacent to a first end and a second end of the switching component in the curved direction.

20. The curved display panel according to claim 19, wherein the at least one spacer portion includes spacer portions dispersed within a plane of the display surface, and one of the spacer portions at a position the closest to the at least one axis of curvature in the curved direction is located at a center of the switching component in the first substrate.

* * * * *